(12) United States Patent
Hase et al.

(10) Patent No.: US 7,052,769 B2
(45) Date of Patent: May 30, 2006

(54) LAMINATE FILM AND ARTICLE HAVING SAME

(75) Inventors: Takakazu Hase, Hirakata (JP); Masahiro Kitamura, Hirakata (JP); Yoshihiko Saitou, Hirakata (JP); Hitoshi Ohgane, Wako (JP); Keisuke Kojima, Wako (JP); Koichi Takahashi, Ota-ku (JP)

(73) Assignees: Nippon Bee Chemical Co., Ltd., Osaka (JP); Honda Motor Co., Ltd., Tokyo (JP); Nippon Paint Co., Ltd., Osaka (JP)

( * ) Notice: Subject to any disclaimer, the term of this patent is extended or adjusted under 35 U.S.C. 154(b) by 219 days.

(21) Appl. No.: 10/811,240

(22) Filed: Mar. 29, 2004

(65) Prior Publication Data

US 2004/0258905 A1    Dec. 23, 2004

(30) Foreign Application Priority Data

Mar. 31, 2003  (JP)  ............................. 2003-094275
Mar. 31, 2003  (JP)  ............................. 2003-094346

(51) Int. Cl.
*B32B 27/40*  (2006.01)

(52) U.S. Cl. ............................. 428/423.3; 428/423.1; 428/424.4; 428/328; 428/515

(58) Field of Classification Search ............. 428/423.3, 428/423.1, 328, 424.4, 515
See application file for complete search history.

(56) References Cited

U.S. PATENT DOCUMENTS 6,096,378 A * 8/2000 Komatsu et al. ......... 427/407.1
2004/0138368 A1   7/2004 Ohgane

FOREIGN PATENT DOCUMENTS

| JP | 10-58895 | 3/1998 |
|---|---|---|
| JP | 2000-79796 | 3/2000 |
| JP | 2002-36437 | 2/2002 |
| JP | 2002-240202 | 8/2002 |

* cited by examiner

*Primary Examiner*—Melanie Bissett
(74) *Attorney, Agent, or Firm*—Nixon & Vanderhye P.C.

(57) ABSTRACT

A laminate film includes a guard film layer (A), a clear coating layer (B), and a color coating layer (C). A color coating material, from which the color coating layer (C) is made, contains a shining material (C3) containing at least an aluminum flake. If necessary, the color coating layer further contains an orientation control material (C4).

16 Claims, No Drawings

LAMINATE FILM AND ARTICLE HAVING SAME

This Nonprovisional application claims priority under 35 U.S.C. § 119(a) on Patent Applications Nos. 2003/94275 and 2003/94346 both filed in Japan on Mar. 31, 2003, the entire contents of which are hereby incorporated by reference.

FIELD OF THE INVENTION

The present invention relates to a laminate film that is in a metal-tone or in a metallic tone, and that is used for giving a decorative appearance in a metal-tone or in a metallic-tone to an article (a product, a molded product, a shaped product, a thing having a certain shape, a three dimensional things, a tangible article, etc.). Examples of the article include automobile parts, electric apparatuses, electronic parts, building materials, and the like.

BACKGROUND OF THE INVENTION

Coating process of articles such as automobile parts, electric apparatuses, electronic parts, building materials and the like, generally gives the articles physical/chemical resistance, ornamental property (that is, how aesthetic the articles look after coating), and the like by forming, on surfaces of the articles, a plurality of coating films having different functions. In many cases, spray coating is employed to form the coating films on the articles. The spray coating is advantageous in coating gaps and bag-shaped (cave-shaped) sections of the articles, and has an excellent transfer efficiency. Therefore, the spray coating is one of coating methods used in wide-ranging fields.

On the other hand, the spray coating has such problems: a wide space is required to carry out the spray coating; the spray coating is a costly process; the spray coating requires a complicate process control; etc. That is, in case where the spray coating is used to form a plurality of coating films on an article, the process of the spray coating is a multi-staged process in which the spraying steps for spraying coating materials and baking steps for baking the coating materials are repeated in turn. Thus, a manufacturing line of the multi-staged process requires a wide space. Moreover, because the coating steps and the baking steps are repeated in turn in multi-stages, it is complicate to manage the process of the spray coating. Further, the process of the spray coating consumes a large amount of energy.

In view of this, for decorative-appearance-making process (decoration), a film decoration method has been suggested as a method that has no such problems unlike the spray coating method, that is, as a method (i) that has no need of a wide space for coating, (ii) whose coating process is easy to manage, and (iii) that has a low energy consumption for providing the plurality of the coating films, that is, making the decorative appearance of the article. In the film decorating method, the placing of the film on an article, that is, decorative-appearance-making process of the article is carried out by using a laminate film in which a plurality of coating films are layered. In the film decoration method, the laminate film is placed on a surface of the article in such a manner that the laminate film is firmly adhered (adhered on) with the surface with no space therebetween, thereby giving the decorative appearance to the article, (for example, see (a) the Japanese Unexamined Patent Application, Tokukai, No. 2000-79796 (published on Mar. 21, 2000, (b) the Japanese Unexamined Patent Application, Tokukaihei, No. 10-58895 (published on Mar. 3, 1998.)

By placing the laminate film on the surface of the article, it is possible to form a plurality of coating films on the article without repeating the spraying steps and the baking steps in turn in multi-stages, unlike the spray coating method. Therefore, it is unnecessary to have a wide coating space for carrying out the coating unlike the spray coating method, and it is possible to attain easy process control. Further, decorative-appearance-making process of the article is carried out without multi-staged steps. Thus, it is possible to attain a lower cost production in terms of energy consumption and the like.

However, the conventional laminate film attaches importance to the processing property in order to be able to appropriately perform the formation of the coating films on the article in the decorative-appearance-making process. Therefore, there is necessity for making improvement in the ornamental property of the article having the decorative appearance by using the laminate film. In other words, for the film decoration method, no laminate film has developed, which has both (i) processing property in placing the laminate film on the article in the decorative-appearance-making process, and (ii) ornamental property of the article after the decorative-appearance-making process.

Here, the processing property refers to properties attained by the decorative-appearance-making process of the article by using the laminated film. The properties are: (1) appearance properties such as (i) surface smoothness of the laminate film on the surface of the article, (ii) reproducibility of a shape that the article has before the decorative-appearance-making process, (iii) and the like properties; (2) chemical properties such as durability of the laminate film, and the like properties; and (3) physical properties such as (a) firm adhesion property between the laminate film and the article, (b) mar resistance and impact resistance of the laminate film, and (c) the like properties. Moreover, the ornamental property indicates (4) a shining appearance that indicates how shiny (twinkling) the laminate film is, (5) light scattering property of the laminate film, (6) flip-flop property that indicates a contrast between a highlighted look and a shaded look of the laminate film.

In the decorative-appearance-making process in which a conventional laminate film is used, it is difficult to attain both the processing property and the ornamental property: the decorative-appearance-making process of the article with improved processing property conventionally results in low ornamental property, whereas the decorative-appearance-making process of the article with high ornamental property conventionally has a problem in processing property. Specifically, for example, in case of the decorative-appearance-making process for an automobile parts as the article to which the decorative appearance is to be given, the use of the conventional laminate film has a difficulty in attaining a metal-look appearance or a metallic appearance similar to a metal-look appearance or a metallic appearance attained in an automobile body by the spray coating. Therefore, in the decorative-appearance-making process of the article using the conventional laminate film, it is difficult to achieve an ornamental property equivalent to or better than that of the conventional coating methods such as the spray coating and the like.

SUMMARY OF THE INVENTION

In view of the foregoing conventional problems, objects of the present invention are (i) to provide a laminate film in a metal tone or a metallic tone, the laminate film having both processing property and ornament property, thereby showing excellent processing property in placing the laminate film on an article, and giving, to the article on which the laminate film is provided, an ornamental property that is equivalent or better than the conventional spray coating method, and (ii) to provide an article having the laminate film.

As a result of diligent studies in view of the above problems, the inventors of the present invention found out the followings: (i) by preparing a laminate film in a metal tone, by applying, with a shearing force, a color coating material that contains an aluminum flake that is capable of realizing a high SV value and a high IV value as a shining material (C3), and that has a viscosity not less than 1000 mPaS and not more than 500 mPaS, it is possible to give the laminate film (a) an ornamental property having a high flip-flop property and (b) advantages in (b-1) reproducibility of a three-dimensional shape of a base article (a thing (article) having a certain shape, a three dimensional things, a tangible article, a thing formed by molding (or forming), and the like thing to which the laminate film is attached), (b-2) firm adhesion with respect to the base article, (b-3) durability, and (b-4) the like properties; and (ii) by add an orientation control material (C4) in order to control orientation of the aluminum flake so that a high SV value and a high IV value will be obtained, it is possible to obtain a laminate film in a metallic tone, the laminate film having (c) an excellent ornamental property having high flip-flop property, and (d) processing properties such as (d-1) reproducibility of the three-dimensional shape of the base article, (d-2) adhesion between the laminate film itself and the base article, (d-3) the durability, (d-4) scratching resistance, and (d-5) the like properties. Based on those findings, the present inventors accomplished the present invention.

Specifically, a laminate film of the present invention that includes a guard film layer (A), a clear coating layer (B), and a color coating layer (C), the clear coating layer (B) being provided on the guard film layer (A), and the color coating layer (C) being formed by applying a color coating material on the clear coating layer, is so arranged such that the color coating material contains at least acrylic resin (C1), urethane resin (C2), and a shining material (C3), and has a viscosity not less than 1000 mPa·S and not more than 500 mPa·S at 25° C.; the shining material (C3) contains at least an aluminum flake, which gives an SV value of 120 or more, and an IV value of 200 or more to an evaluation-use coating film containing the aluminum flake; and the color coating material layer (C) is formed by applying the color coating material with a shearing force.

With this arrangement, it is possible to provide a metal-tone laminate film having a metal-tone aesthetic appearance having a high flip-flop property, and excellent shininess that indicates how bright the surface is. Specifically, it is possible to provide a metal-tone laminate film having an IV (Intensity Value) value of 350 or more, an SV (Scatter Value) value of 30 or more, an FF value of 1.8 or more. The FF value relates to the flip-flop property. Therefore, with the arrangement of the metal-tone laminate film, it is possible to provide a metal-tone laminate film having an ornamental property having a metal tone better than a metallic tone that is attained by the decorative-appearance-making process in which the spray coating is used.

Moreover, a laminate film of the present invention that includes a guard film layer (A), a clear coating layer (B), and a color coating layer (C), the clear coating layer (B) being provided on the guard film layer (A), and the color coating layer (C) being formed by applying a color coating material on the clear coating layer, is so arranged that: the clear coating layer (B) contains a clear coating material containing at least (i) acrylic-based resin (B1), (ii) urethane-based oligomer (B2), (iii) a multifunctional monomer (B3), and (iv) a polymerization initiator (B4); the clear coating material contains, based on 100 part by weight of the total amount (B1+B2+B3) of the acrylic-based resin (B1), the urethane-based oligomer (B2), and the multifunctional monomer (B3) by solid contents by weight: the acrylic-based resin (B1), by solid content, not less than 29 parts by weight and not more than 70 parts by weight; the urethane-based oligomer (B2), by solid content, not less than 20 parts by weight and not more than 70 parts by weight; and the multifunctional monomer (B3), by solid content, not less than 1 part by weight and not more than 40 parts by weight; and the polymerization initiator (B4), by solid content, not less than 0.1 part by weight and not more than 20 parts by weight; the color coating layer (C) contains a color coating material containing at least (i') acrylic resin (C1), (ii') urethane resin (C2), (iii') a shining material (C3), and (iv') an orientation control material (C4), the shining material (C3) containing at least an aluminum flake, which gives an SV value of 85 or more, and an IV value of 250 or more to an evaluation-use coating film containing the aluminum flake, and the orientation control material (C4) containing at least one of an extender pigment and a resin bead; the color coating material contains, based on 100 parts by weight of a total amount (C1+C2) of the acrylic resin (C1) and the urethane resin (C2) by solid content: the acrylic resin (C1), by solid content, not less than 10 parts by weight and not more than 80 parts by weight; the urethane resin (C2), by solid content, not less than 20 parts by weight and not more than 90 parts by weight; the aluminum flake, by solid content, not less than 1 part by weight and not more than 30 parts by weight; and the orientation control material (C4), by solid content, not less than 2 parts by weight and not more than 20 parts by weight.

With the above arrangement, it is possible to provide a laminate film having an aesthetic appearance in the metallic tone excellent in the flip-flop property, and excellent shininess and light scattering property. Specifically, it is possible to attain a laminate film in the metallic tone having an IV value of 200 or more, an SV value of 100 or more, and an FF value of 1.6 or more. Therefore, with this arrangement, it is possible to provide a laminate film in a metallic tone having an excellent ornamental property equivalent to or better than an appearance in a metallic tone attained by the decorative-appearance-making process carried out by the spray coating.

Especially, because the color coating material contains the orientation control material (C4), it is possible to a laminate film in the metallic tone having such high IV value, high SV value, high FF value as described above, even if the evaluation-use coating film containing the aluminum flake has relatively low IV value and SV value.

Moreover, the laminate films are excellent in the processing property in placing the laminate film on the base article. That is, during the decorative-appearance-making process, the metal-tone laminate film excellently copies a three dimensional shape of the base article on which the laminate film is placed on. Therefore, the use of any of the laminate films gives appearance properties excellent in (a) a surface smoothness of the surface of the laminate films placed on the base article, (b) the reproducibility of the three dimensional shape of the base article, (c) and the like properties. Further, by the decorative-appearance-making process in which any of the laminate films is used, it is possible to attain chemical properties such as durability and the like, and physical properties such as mar resistance, impact resistance, firm adhesion between the laminate film and the base article, and the like properties.

As described above, the use of any of the laminate films of the present invention makes it possible to have both the excellent ornamental property and the processing property for the decorative-appearance-making process. Because of this, it is possible to realize (a) cost-wise improvements such as smaller space for coating, easy control in coating, smaller energy consumption, and the like, (b) an ornamental property and processing property equivalent to or better than those attained by the spray coating method.

Moreover, an article of the present invention includes a laminate film of present invention, provided on a base article.

With this arrangement, in which any of the laminate films is used, it is possible to provide an article having a metal-tone aesthetic appearance having high flip-flop property or being excellent in (i) metallic effect having high flip-flop property, (ii) shininess, (iii) light scattering property. Moreover, it is possible to provide an article excellent in (iv) appearance property such as smoothness of the laminate film on the article, evenness in film thickness, and the like (v) chemical/physical properties such as adhesion between the base article and the laminate film, durability, scratching resistance, impact resistance and the like.

For a fuller understanding of the nature and advantages of the invention, reference should be made to the ensuing detailed description taken in conjunction with the accompanying drawings.

DESCRIPTION OF THE EMBODIMENTS

A laminate film of the present invention includes a plurality of coating layers formed in lamination. The plurality of coating layers contain different coating materials from each others. The laminate film of the present invention is a laminate film in a metal tone or a laminate film having aesthetic appearance in a metallic tone having a bright shininess, a high light scattering property, and a high flip-flop property and bright shininess. The laminate film is adhered on a surface of an article such as automobile parts, electronic parts, and the like, by applying pressure and using an adhesive agent or the like. Thereby, the laminate film is firmly adhered onto the surface. In this way, a metal-tone decoration appearance is given to the surface of the article.

Specifically, of the laminate films of the present invention, the laminate film having the ornamental property in the metal tone has an IV (Intensity Value) value of 350 or more. The IV value indicates how bright a highlighted look of the laminate film is. Further, the laminate film of the present invention in the metal tone has an SV (scatter Value) value of 30 or more. The SV value indicates how much light scattering occurs on the surface of the laminate film. With this arrangement, the laminate film of the present invention has a flip-flop property with which the highlighted look of the laminate film appears in a very strong metal effect, whereas a shaded look thereof appears in a week metal effect. A greater difference in the metal tone between the highlighted look and the shaded look leads to a greater difference in brightness/darkness therebetween. Thus, the larger difference in the metal tone between the highlighted look and the shaded look gives a higher flip-flop property. The flip-flop property is, as described below, evaluated by an FF value. The laminate film of the present invention has an FF value of 1.8 or more. The FF value of the laminate film of the present invention is higher than an FF value of a metallic-tone appearance attained by decorative-appearance-making process in which the spray coating is used. Thus, the FF value of the laminate film of the present invention indicates that the laminate film of the present invention has an excellent metal-tone ornamental property.

Furthermore, of the laminate films of the present invention, the laminate film having the ornamental property in the metallic tone has an IV value of 200 or more and an SV value of 100 or more. Therefore, a highlighted look of the laminate film appears in a strong metal effect. A shaded look of the laminate film appears still in metal effect, even though the metal effect of the shaded look is weaker than that of the highlighted look. Thus, it is possible to provide a laminate film in a metallic tone having a high flip-flop property having high metal effects both in its highlighted look and the shaded look. The laminate film in the metallic tone has an FF value of 1.6 or more, which is equal or more than an FF value of a metallic tone appearance attained by the spray coating. The FF value of the laminate film indicates that the laminate film has an excellent ornamental property in the metallic tone.

Moreover, the laminate film of the present invention is excellent in processing property. The processing properties are, for example, surface smoothness of the laminate film on the surface of the article, film thickness evenness of the laminate film, reproducibility of three-dimensional shape of the article, firm adhesion property of the laminate film and the article, durability, mar resistance, impact resistance, and the like property.

Therefore, the use of the laminate film of the present invention realizes a high-quality decorative-appearance-making process of the article, and attain an excellent ornamental property of the article having the decorative appearance thus formed (article with decorated appearance). That is, the laminate film of the present invention has both (i) the processing property in making a decorative appearance of the article and (ii) the ornamental property of the article having the decorative appearance.

In order to attain the processing property and the ornamental property, the laminate film of the present invention includes a guard film layer (A), a clear coating film layer (B), and a color coating film layer (C). The clear coating film layer (B) and the color coating film layer (C) are layered on the guard film layer (A) in this order. The clear coating film layer contains a clear coating material as a coating material. The color coating film layer (C) contains a coloring coating material as a coating material. The color coating material, as described later, contains an aluminum flake as a shining material (C3).

In case of the laminate film in the metal tone, it is preferable that SV and IV values being evaluated by using an evaluation-use coating film containing the aluminum flake are an SV value of 120 or more and an IV value of 200 or more (the aluminum flake gives an SV value of 120 or more and an IV value of 200 or more, to an evaluation-use coating film containing the aluminum flake, the SV and IV values being evaluated by using the evaluation-use coating film containing the aluminum flake). Moreover, as described below, it is preferable that the color coating film layer (C) is formed by applying the color coating material with a shearing force.

In case of the laminate film in the metallic tone, it is preferable that SV and IV values being evaluated by using an evaluation-use coating film containing the aluminum flake are an SV value of 85 or more and an IV value of 250 or more (the aluminum flake gives an SV value of 85 or more and an IV value of 250 or more, to an evaluation-use coating film containing the aluminum flake, the SV and IV values being evaluated by using the evaluation-use coating film containing the aluminum flake). Further, it is preferable that the color coating material contains a orientation control material (C4).

If necessary, the laminate film of the present invention may be so arranged as to include an adhesive agent layer and an inner film layer on the color coating film layer (C) in this order. This will be discussed in detail later. The following explains those layers.

[1] Guard Film Layer (A)

The guard film layer (A) is a supporting body for supporting the coating materials that are respectively contained in the clear coating film layer (B) and the color coating film layer (C) described later. The guard film layer (A) is used in order to maintain a good processing property in performing the decorative-appearance-making process of the article. Moreover, after the decorated article (article having decorative appearance) is formed by placing the laminate film on the article, the guard film protects the clear coating film layer (B), the color coating film layer (C), and the like, thereby attaining better damage resistance property of the surface of the article and surface smoothness of the surface of the decorated article.

The guard film layer (A) has a tensile strength whose lower limit at 20° C. is 10 kg/cm$^2$ or higher and preferably 5 kg/cm$^2$ or higher, and whose upper limit at 20° C. is 200 kg/cm$^2$ or lower, and preferably 100 kg/cm$^2$ or lower. If the tensile strength is lower than 10 kg/cm$^2$, the laminate film has an uneven film thickness after the decorative-appearance-making process of the article. If the tensile strength is 200 kg/cm$^2$, the decorative-appearance-making process of the article cannot be carried out with a high shape-suiting property with respect to a three-dimensional shape of the article. Thus, it becomes difficult to perform a good decorative-appearance-making process.

Note that the tensile strength (kg/cm$^2$) refers to a force that is applied per unit area at the time when the guard film layer (A) is torn off by being pulled at a pulling rate of 50 mm/min under a temperature condition of 20° C. by using a Tensilon HTM-500 (Product Name: made by Toyo Baldwin Co., Ltd.).

Moreover, elongation after tearing (after-tearing elongation) (at 20° C.) of the gourd film layer (A) is preferably 50% or more, and more preferably 100% or more. If the after-tearing elongation is 50% or more, it is possible to attain an excellent shape-suiting property with respect to the three-dimensional shape of the article, thereby attaining a high-quality decorative-appearance-making process.

The after-tearing elongation (%) is determined by using the Tensilon HTM-500 used in measuring the tensile strength. That is, the guard film layer (A) is pulled at a pulling rate of 50 mm/min under a temperature condition of 20° C. by using a Tensilon HTM-500 (Product Name: made by Toyo Baldwin CO., Ltd.) until the guard film layer (A) is torn off. The after-tearing elongation is determined by comparing a length of the guard film layer (A) at the time of the tear and a length thereof before being pulled.

Furthermore, in order to attain a good light transparence after the decorative-appearance-making process, light transparence (at wavelength of 365 nm) of the guard film layer (A) is preferably 50% or more, and more preferably 70% or more. If the light transparence is less than 50%, the photo-curing of the clear coating layer (B) becomes difficult after the decorative-appearance-making process because the low transparence reduces an amount of a light beam to pass through the guard film layer (A) to reach the clear coating layer (B).

Moreover, the guard film layer (A) functions as the surface of the article on which the laminate film is adhered. Thus, it is preferable that the guard film layer (A) has a water contact angle in a range of 60° or more and 120° or less. It is more preferable that the guard film layer (A) has a water contact angle in a range of 70° or more and 110° or less. If the water contact angle is less than 60°, it becomes difficult to peel off the guard film layer (A) after the decorative-appearance-making process of the article. On the other hand, if the water contact angle is more than 120°, the guard film layer (A) repels the clear coating material when applying the clear coating material thereon, the clear coating material being the coating material from which the clear coating film layer (B) is made. Thus, it becomes difficult to form the clear coating film layer (B) on the guard film layer (A).

The guard film layer (A) is not particularly limited in terms of its material, configuration, and the like, provided that the guard film layer (A) has the aforementioned tensile strength, elongation after-tearing, light transmittance, and water contact angle. Specifically, the guard film layer (A) may be: polyethylene terephthalate (PET)-based films such as Nova Clear SG007 (Product Name: made by Mitsubishi Chemical Corp.), Dia cral series (made by Mitsubishi Plastics Inc.) and the like; polyolefine-based films such as opulent TPX series (made by Mitsui Chemicals Inc.), tolefan series (made by Toray Plastic Films Co., Ltd.), and the like; acrylic-based film such as acrylplene series (made by Mitsubishi Rayon Co., Ltd.).

Moreover, the guard film layer (A) may be arranged as, for example, a single layered film, a co-extrusion film, a laminate film, a peel-off film that has been subjected to peel-off treatment, and the like film. The peel-off treatment for the peel-off film is not particularly limited, but may be silicone-type treatment, non-silicone-type treatment, urethane resin coating treatment, and the like treatment.

[2] Clear Coating Film Layer (B)

The clear coating film layer (B) gives, to the laminate film, not only (i) physical/chemical properties such as durability, scratch resistance, impact resistance, water resistance, but also (ii) ornamental property by giving glazing property and protecting a color tone given by the later described color coating film layer (C). The clear coating film layer (B) contains the clear coating material, which is the coating material. The clear coating material preferably has photo-curing property so that the clear coating material can be cured by radiating electromagnetic wave (light) thereon. Especially, it is preferable that the clear coating material has a ultraviolet curing property so that the clear coating material is cured by an ultraviolet ray (UV) radiated thereon after the decoration of the article.

In case where the clear coating material has the photo curing property, it is preferable that the clear coating film layer (B) before the radiation of the electromagnetic wave (light), that is, the clear coating film layer (B) before the clear coating material is cured, has an after-tearing elongation of 400% or more under a temperature condition of 80° C. If the after-tearing elongation is less than 400%, flowability of the clear coating layer (B) becomes uneven in making the decorative appearance of the article by using the laminate film.

Note that the after-tearing elongation is determined by using a pre-curing sample prepared as follows: (1) the clear coating material applied with a thickness of 40 μm on a PET (Polyethylene Terephthalate)-based film; (2) the clear coating material is dried at a temperature of 80° C. for 15 minutes; and (3) the PET (Polyethylene Terephthalate)-based film is peeled off from the dried clear coating material, thereby forming the pre-cured sample. At the temperature condition of 80° C., the pre-cured sample is pulled until tear at a pulling rate of 50 mm/min by using the Tensilon HTM-500.

Moreover, as to a universal hardness (N/mm$^2$) of the clear coating film layer (B) after the clear coating material is cured, it is preferable that the universal hardness is preferably 80N/mm$^2$ or more, and more preferably 120N/mm$^2$ or more, under a temperature condition of 25° C. If the universal hardness is less than 80N/mm$^2$, the clear coating film layer (B) has a low mar resistance.

Evaluation of the universal hardness is carried out by application of load onto a clear coating film layer (B) formed on a guard film layer (A). Specifically, a load of 5 mN is applied for 30 seconds onto the clear coating film layer (B) provided on the guard film layer (A) by using a fisher-scope H-100 (Fisher Instruments K.K.), and a maximum depth of push-down concave shape of the clear coating layer (B) is measured. The universal hardness is evaluated based on the maximum depth.

Further, the tensile strength of the clear coating film layer (B) after the clear coating material is cured is preferably 400 kg/cm$^2$ or more, and more preferably 450 kg/cm$^2$ or more. If the tensile strength is less than 400 kg/cm$^2$, the laminate film has low mar resistance and impact resistance. Moreover, the after-tearing elongation of the clear coating film layer (B) after the clear coating material is cured is preferable 5% or more, and more preferably 7% or more. If the after-tearing elongation is less than 5%, the laminate film has low mar resistance and poor flexibility.

Evaluation of the tensile strength and the after-tearing elongation of the clear coating film layer (B) after the clear coating material is cured is carried out with a cured sample prepared as follows: (1) the clear coating material is applied on a PET-based film so as to be 40 μm thick when dried; the clear coating material on the PET-based film is dried at 80° C. for 15 minutes; a PET-based film is further placed on the dried clear coating material; The clear coating material is cured by light radiation; and both the PET-based films are peeled off.

The tensile strength and the after-tearing elongation are determined by pulling the cured sample until tear at a pulling rate of 50 mm/min by using the Tensilon HTM-500 under a temperature condition of 20° C.

The clear coating film layer (B) is not particularly limited in terms of component contained in the clear coating material, provided that the clear coating film layer (B) contains a clear coating material satisfying each condition. However, it is preferable that the clear coating material contains acrylic-based resin (B1), urethane-based oligomer (B2), multi-functional monomer (B3), and a polymerization initiator (B4). Further, the clear coating material may be so arranged as to contain, in addition to those components, another component such as binder resin, a cross-linking agent, an ultraviolet absorbing agent (UVA), a light stabilizer (HALS), a leveling agent, a deforming agent, a polymerization inhibitor, a solvent, and the like. The following explains those.

[2-1] Acrylic-Based Resin (B1)

The acrylic-based resin (B1) may be reactive acrylic resin that is radically polymerizable by electromagnetic radiation, or non-reactive acrylic resin that is unreactive even by the electromagnetic radiation.

The reactive acrylic resin is not particularly limited, provided that the resin is acrylic resin in its main structure and has a polymerizing double bond that allows the radical polymerization. Polymerizable double bond equivalent is preferably not less than 400 g and not more than 5,000 g, and more preferably not less than 700 g and not more than 2,000 g.

If the polymerizable double bond equivalent is less than 400 g, the uncured clear coating layer has an sticky (tacky) surface. Thus, the polymerizable double bond equivalent less than 400 g is not preferable. Moreover, the polymerizable double bond equivalent less than 400 g gives the clear coating layer (B) an excessively high hardness and therefore a poor flexibility. On the other hand, if the polymerizable double bond equivalent is more than 5,000 g, the clear coating layer (B) has a low hardness.

Moreover, as to a weight average molecular weight MW of the reactive acrylic resin, it is preferable that the weight average molecular weight MW is 30,000 or more and 200,000 or less. Further, it is more preferable that the weight average molecular weight MW is 50,000 or more and 150,000 or less.

If the weight average molecular weight MW is less than 30,000, a surface of the clear coating film is sticky before the curing. Thus, the weight average molecular weight MW less than 30,000 is not preferable. On the other hand, if the weight average molecular weight MW is more than 200,000, the reactive acrylic resin has a low compatibility with the other components contained in the clear coating material, and the clear coating layer (B) has an uneven flowability in making the decorative appearance of the article by using the laminate film.

Furthermore, it is preferable that glass transition temperature Tg of the reactive acrylic resin is 40° C. or more and 120° C. or less. It is more preferable that the glass transition temperature Tg of the reactive acrylic resin is 60° C. or more and 90° C. or less. If the glass transition temperature Tg is less than 40° C., the surface of the clear coating film is sticky before curing. Thus, the glass transition temperature Tg is less than 40° C. is not preferable. Moreover, if the glass transition temperature Tg is more than 120° C., the clear coating film layer (B) becomes rigid and fragile.

Examples of the reactive acrylic resin are acrylic resin MR8317 (solid content by weight=42%), MR8318 (solid content by weight=43.5%), MR8319 (solid content by weight=50%) (which are all made by Mitsubishi Rayon Co., Ltd.), and the like. The reactive acrylic resin may be one of them or a combination of two or more of them.

Moreover, the non-reactive acrylic resin is acrylic resin in its main structure and has no radical polymerization property. Specifically, it is preferable that a weight average molecular weight MW of the non-reactive acrylic resin is 30,000 or more and 200,000 or less. It is more preferable that the weight average molecular weight MW of the non-reactive acrylic resin is 50,000 or more and 150,000 or less. If the weight average molecular weight MW is less than 30,000, the surface of the uncured clear coating film prepared by applying the clear coating material on the guard film layer (A) is sticky. On the other hand, if the weight average molecular weight MW is more than 200,000, the non-reactive acrylic resin has a low compatibility with the other components contained in the clear coating material, and thus the clear coating layer (B) becomes uneven in flowability in placing the laminate film on the base article.

Furthermore, it is preferable that a glass transition temperature Tg of the non-reactive acrylic resin is 40° C. or more and 120° C. or less. It is more preferable that the glass transition temperature Tg of the non-reactive acrylic resin is 70° C. or more and 110° C. or less. If the glass transition temperature Tg is less than 40° C., the surface of the clear coating film is sticky before curing. Thus, the glass transition temperature Tg less than 40° C. is not preferable. Moreover, if the glass transition temperature Tg is more than 120° C., the clear coating film layer (B) becomes rigid and fragile.

Examples of the non-reactive acrylic resin are: acrylic resin BR75 (Solid Content by weight=100%, Tg=90° C., MW=85,000), BR77 (Solid Content by weight=100%, Tg=80° C., MW=60,000), BR80 (Solid Content by weight=100%, Tg=105° C., MW=95,000), BR82 (Solid Content by weight=100%, Tg=95° C., MW=150,000) (which are made by Mitsubishi Rayon Co., Ltd.), and the like. The reactive acrylic resin may be one of them or a combination of two or more of them.

Based on 100 part by weight of a total amount (B1+B2+B3) of the acrylic-based resin (B1), the urethane-based oligomer (B2), and the multifunctional monomer (B3) by solid contents by weight, a lower limit of the acrylic-based resin (B1) content is preferably 29 parts or more by weight, and more preferably 39 parts or more by weight. Furthermore, based on 100 part by weight of the total amount (B1+B2+B3), an upper limit of the acrylic-based resin (B1) content is preferably 70 parts or less by weight, and more preferably 60 parts or less by weight.

If the acrylic-based resin (B1) content is less than 29 parts by weight, the surface of the uncured clear coating film prepared by applying the clear coating material on the guard film layer (A) becomes sticky. Thus, the acrylic-based resin (B1) content less than 29 parts by weight is not preferable. Moreover, the acrylic-based resin (B1) content less than 29 parts by weight causes the clear coating film layer (B) to have low hardness and low durability. On the other hand, if the acrylic-based resin (B1) content is more than 70 parts by weight, the clear coating layer (B) becomes uneven in flowability in placing the laminate film on the base article, and has a low tensile strength and a poor flexibility.

[2-2] Urethane-Based Oligomer (B2)

The urethane-based oligomer (B2) is not particularly limited, provided that the urethane-based oligomer (B2) has a polymerizable double bond that allows radical polymerization. Specifically, it is preferable that a weight average molecular weight MW of the urethane-based oligomer (B2) is not less than 500, and not more than 10,000. It is more preferable that the weight average molecular weight MW of the urethane-based oligomer (B2) is not less than 1,000 and not more than 3,000.

If the weight average molecular weight MW is less than 500, shrinkage of the clear coating material in curing becomes large and the clear coating film layer (B) has a poor flexibility. Moreover, if the weight average molecular weight MW is more than 10,000, the urethane-based oligomer (B2) has low compatibility with respect to the other component contained in the clear coating material, and the clear coating film layer (B) has a low tensile strength.

Moreover, it is preferable that the urethane-based oligomer (B2) has two to six polymerizable double bonds per molecule. If the urethane-based oligomer (B2) has less than two polymerizable double bonds per molecule, the clear coating material smells badly. If the urethane-based oligomer (B2) has more than six polymerizable double bonds per molecule, the clear coating film layer (B) has a poor flexibility.

Examples of the urethane-based oligomer (B2) are: ebecryl EB8804/10EA (MW=1,000, polymerizable double bond number=2, made by Daicel UCB Co., Ltd.), UV 7000B (MW=3,500, made by Nippon Gosei Kagaku Kyogyo Co. Ltd.), UF8001 (MW 3,200, polymerizable double bond number=2, made by Kyoeisha Chemical Co., Ltd.), UA306H (polymerizable double bond number=6, Kyoeisha Chemical Co., Ltd.), and the like. The urethane-based oligomer (B2) may be one of them or a combination of two or more of them.

Based on 100 part by weight of a total amount (B1+B2+B3) of the acrylic-based resin (B1), the urethane-based oligomer (B2), and the multifunctional monomer (B3) by solid contents by weight, a lower limit of the urethane-based oligomer (B2) content is preferably 20 parts or more by weight, and more preferably 30 parts or more by weight. Furthermore, based on 100 part by weight of the total amount (B1+B2+B3), an upper limit of the urethane-based oligomer (B2) content is preferably 70 parts or less by weight, and more preferably 60 parts or less by weight.

In a case where the urethane-based oligomer (B2) content is less than 20 parts by weight, the clear coating layer (B) becomes uneven in flowability in placing the laminate film on the base article. Moreover, the urethane-based oligomer (B2) has a poor flexibility. On the other hand, if the urethane-based oligomer (B2) content exceeds 70 parts by weight, the clear coating surface, which is prepared by applying the clear coating material on the guard film layer (A) and has not been cured yet, becomes sticky. Thus, the urethane-based oligomer (B2) content exceeding 70 parts by weight is also not preferable.

[2-3] Multifunctional Monomer (B3)

The multifunctional monomer (B3) is not particularly limited, provided that the multifunctional monomer (B3) is a (meth)acrylate-type monomer having two or more functional groups.

Specifically, examples of the multifunctional monomer (3) are: (meth)acrylate-type monomers having two functional groups, such as polyethylene glycoldi(meth)acrylate, NK ester 2G (made by Shin-nakamura chemical corp.), and the like; (meth)acrylate-type monomers having three functional groups, such as trimethylolpropanetri(meth)acrylate and the like; (meth)acrylate-type monomers having four functional groups, such as pentaerythritoltetra(meth)acrylate and the like; (meth)acrylate-type monomers having six functional groups, such as kayarad DPCA 20 (made by Nippon Kayaku Co., Ltd.); and the like. The multifunctional monomer (3) may be one of them, or a combination of two or more of them.

Based on 100 part by weight of the total amount (B1+B2+B3) of the acrylic-based resin (B1), the urethane-based oligomer (B2), and the multifunctional monomer (B3) by solid contents by weight, it is preferable that the multifunctional monomer (B3) content has a lower limit of 1 part or more by weight and an upper limit of 40 parts or less by weight. It is more preferable that the upper limit is 20 parts or less by weight.

If the multifunctional monomer (B3) content is less than 1 part by weight, the clear coating layer (B) has low hardness and low tensile strength. On the other hand, if the multifunctional monomer (B3) content exceeds 40 parts by weight, the uncured clear coating surface, which is prepared by applying the clear coating material on the guard film layer (A), becomes sticky. Thus, the multifunctional monomer (B3) content exceeding 40 parts by weight is not preferable. Further, if the multifunctional monomer (B3) content exceeds 40 parts by weight, the clear coating material is cured with a larger shrinking, thereby resulting in a poor flexibility.

[2-4] Polymerization Initiator (B4)

The polymerization initiator (B4) is not particularly limited, but may be an ultraviolet (UV) curing initiator, a thermocuring radical polymerization initiator, or the like.

Examples of the ultraviolet curing initiator are: benzoin-type compounds such as benzoin methyl ether and the like; anthraquinone-type compounds such as 2-ethylanthraquinone and the like; benzophenone-type compounds such as benzophenone and the like; sulfide-type compounds such as diphenyl sulfide and the like; thioxanthone-type compounds such as 2,4-dimethylthioxanthone and the like; acetophenone-type compounds such as 2,2-dimethoxy-2-phenylacetophenone and the like; phosphinoxide-type compounds such as 2,4,6-trimethylbenzoindiphenylphosphinoxide and the like; Ilgacure (Registered Trademark)-184, Ilgacure-819 (which are all made by Chiba Specialty Chemicals K.K.); and the like. One of them, or a combination of two or more of them may be used as the ultraviolet curing initiator.

The thermocuring radical polymerization initiator may be an organic peroxide. For example, the thermocuring radical polymerization initiator may be t-amylperoxy-2-ethylhexanate, bis(4-t-butylcyclohexyl)peroxydicarbonate, Trigonox (Registered Trademark) 121-50 (made by Kayaku Akzo Corp.), and the like. One of the organic peroxides, or a combination of two or more of the organic peroxides may be used as the thermocuring radical polymerization initiator.

Based on 100 part by weight of the total amount (B1+B2+B3) of the acrylic-based resin (B1), the urethane-based oligomer (B2), and the multifunctional monomer (B3) by solid contents by weight, a lower limit of polymerization initiator (B4) content is 0.1 part or more by weight preferably, and 1 part or more by weight more preferably. Moreover, based on 100 part by weight of the total amount (B1+B2+B3), an upper limit of the polymerization initiator (B4) content is 20 parts or less by weight preferably, and 10 parts or less by weight more preferably.

Because the polymerization initiator (B4) is expensive, it is preferable that the polymerization initiator (B4) content is as little as possible in terms of cost. However, in order to attain the enough curing of the clear coating material, it is preferable that at least 0.1 part or more by weight of the polymerization initiator (B4) is contained based on 100 parts by weight of the total amount (B1+B2+B3).

[2-5] Other Component (B5)

The clear coating material, which contains the acrylic-based resin (B1), the urethane-based oligomer (B2), and the multifunctional monomer (B3), may be so arranged as to further contain a compound that is generally added in coating materials.

Such other component (B5) may be: binder resin or a cross-linking agent such as modified acrylic resin, polyester resin, epoxy resin, melamine resin, polyisocyanate compounds, block polyisocyanate compounds, and the like; an ultraviolet ray absorbing agent (UVA) such as Tinubin (Registered Trademark) 400,900,1130 (made by Chiba Specialty Chemicals K.K.) and the like; a light stabilizer (HALS) such as Sanol (Registered Trademark) LS292, LS770 (made by Sankyo Co., Ltd.), Tinubin 123 (made by Chiba Specialty Chemicals K.K.). Besides those, a leveling agent, a deforming agent, a polymerization inhibitor, and/or the like may be added to the coating material, according to needs.

Furthermore, the coating material may contain a well-know organic solvent for coating material-use, in order to use the solvent to dissolve each component therein. The organic solvent may be an organic solvent of ester type, an organic solvent of ether type, an organic solvent of alcohol type, an organic solvent of amid type, an organic solvent of ketone type, an organic solvent of aliphatic hydrocarbon type, an organic solvent of cycloaliphatic hydrocarbon type, an organic solvent of aromatic hydrocarbon type, and the like organic solvent. Those organic solvents may be used solely or a combination of two or more of the organic solvents may be used in combination.

There is no particular limit in other component (B5) content.

[3] Color Coating Film Layer (C)

The color coating film layer (C) gives higher ornamental property to the article by giving a desired colored appearance to the article. Moreover, the color coating film layer (C) hides a background surface of the article, thereby keeping an aesthetic appearance of the article in a good quality.

The color coating layer (C) contains a color coating material that is a coating material. The color coating layer (C) contains acrylic resin (C1), urethane resin (C2) and a shining material (C3), and may further contain an orientation control material (C4). The color coating material may further contains an other component (C5) in addition to these components mentioned above. The other component (C5) may be an ultraviolet ray absorbing agent (UVA), a light stabilizer (HALS), binder resin, a cross-linking agent, a pigment, a leveling agent, a deforming agent, a conductive filler, a solvent, and/or the like.

Moreover, especially in case of obtaining the laminate film in the metal tone as the laminate film, it is preferable that a lower limit of viscosity of the color coating material (C) is 1,000 mPa·S or more at a temperature of 25° C. It is more preferable that the lower limit of the viscosity of the color coating material is 1,500 mPa·S or more at a temperature of 25° C. Furthermore, it is preferable that an upper limit of viscosity of the color coating material (C) is 5,000 mPa·S or less at a temperature of 25° C. It is more preferable that the upper limit of the viscosity of the color coating material (C) is 4,500 mPa·S or less at a temperature of 25° C.

If the lower limit of the viscosity is less than 1,000 mPa·S, it is impossible to obtain sufficient metal-tone appearance. Thus, it is not preferable that the lower limit of the viscosity is less than 1,000 mPa·S. Moreover, if the upper limit of the viscosity is more than 5,000 mPa·S, the color coating layer (C) has a poor surface smoothness.

In the following, each component contained in the color coating material is explained.

[3-1] Acrylic Resin (C1)

The acrylic resin (C1) is not particularly limited. However, it is preferable that the acrylic resin (C1) has a weight average molecular weight MW not less than 3,000 and not more than 30,000. It is more preferable that the acrylic resin (C1) has a weight average molecular weight MW not less than 10,000 and not more than 20,000. If the acrylic resin (C1) has a weight average molecular weight MW of less than 3,000, the color coating layer (C) has a low tensile strength. On the other hand, the acrylic resin (C1) having a weight average molecular weight MW of more than 30,000, has a poor compatibility with the other components contained in the color coating material (C) than the acrylic resin (C1).

Moreover, it is preferable that the acrylic resin (C1) has a glass transition temperature Tg whose lower limit is 0° C. or more. It is more preferable that the acrylic resin (C1) has a glass transition temperature Tg whose lower limit is 40° C. or more. Furthermore, it is preferable that the acrylic resin (C1) has a glass transition temperature Tg whose upper limit is 100° C. or less. It is more preferable that the acrylic resin (C1) has a glass transition temperature Tg whose upper limit is 70° C. or less. If the acrylic resin (C1) has a glass transition temperature Tg less than 0° C., the color coating layer (C) has a low tensile strength. On the other hand, if the acrylic resin (C1) has a glass transition temperature Tg more than 100° C., it becomes difficult to attain a lamination film having an aesthetic metal-look appearance having a high flip-flop property, or an aesthetic metallic-tone appearance having a high flip-flop property.

Examples of the acrylic resin (C1) having the weight average molecular weight MW and the glass transition temperature Tg in the range are: NBC 2050-55 (having a solid content 55% by weight; made by Toray Industries Inc.), NBC 2058 (having a solid content 50% by weight; made by Toray Industries Inc.), NBC varnish B (having a solid content 50% by weight; made by Mitsui Toatsu Chemicals Inc.), ACR 9013 (having a solid content 50% by weight; made by Nippon Paint Co., Ltd.), BAR 010 (having a solid content 50% by weight, made by Hitachi Chemical Co., Ltd.), and the like. The acrylic resin (C) may be one of them or a combination of two or more of them.

Based on 100 parts by weight of a total amount (C1+C2), by solid content by weight, of the acrylic resin (C1) and the urethane resin (C2), a lower limit of acrylic resin (C) content is 10 parts or more by weight preferably, and 20 parts or more by weight more preferably. Moreover, Based on 100 parts by weight of the total amount (C1+C2), an upper limit of the acrylic resin (C) content is 80 parts or less by weight preferably, and 70 parts or less by weight more preferably.

If the lower limit of the acrylic resin (C1) content is less than 10 parts by weight, the color coating layer (C) has a low firm adhesion property with respect to the clear coating layer (B), whereby adhesion between the color coating layer (C) and the clear coating layer (B) becomes poor. The poor adhesion between these layers results in delamination between the color coating layer (C) and the clear coating layer (B). Moreover, if the lower limit of the acrylic resin (C1) is less than 10 parts by weight, the whether resistance property is reduced. On the other hand, if the upper limit of the acrylic resin (C1) content is more than 80 parts by weight, the color coating material has an uneven flowability in forming the color coating layer (C), and the color coating layer (C) has a poor flexibility.

[3-2] Urethane Resin (C2)

The urethane resin (C2) is not particularly limited. However, it is preferable that the urethane resin (C2) has a weight average molecular weight MW not less than 10,000 and not more than 100,000. It is more preferable that the urethane resin (C2) has a weight average molecular weight MW not less than 40,000 and not more than 60,000.

Moreover, it is preferable that a lower limit of an amount of urea bond (—NH—CO—NH—) is 0.14 mmol/g or more. It is more preferable that the lower limit of the amount of urea bond (—NH—CO—NH—) is 0.56 mmol/g or more. Furthermore, it is preferable that an upper limit of the amount of urea bond (—NH—CO—NH—) is 1.12 mmol/g or less. It is more preferable that the upper limit of the amount of urea bond (—NH—CO—NH—) is 0.84 mmol/g or less. If the amount of urea bond is less than 0.14 mmol/g, the color coating layer (C) has a low tensile strength. If the amount of urea bond exceeds 1.12 mmol/g, the color coating material (C) has an uneven flowability in forming the color coating material layer (C), and the urethane resin (C2) has a low compatibility with the other components to be contained in the color coating material than the urethane resin (C2).

Furthermore, it is preferable that the urethane resin (C2) contains at least one of a OH group, a COOH group, and a $NH_2$ group. It is especially preferable that the urethane resin contains a OH group.

Examples of the urethane resin (C2) is XE-75-H3 (Solid Content by weight=25%), XE-75-H17 (Solid Content by weight=25%), XE-75-H29 (Solid Content by weight=25%), XE-75-H30 (Solid Content by weight=25%), XE-75-H31 (Solid Content by weight=40%), XE-75-H40 (Solid Content by weight=35%) (which are all made by Mitsui Takeda Chemicals Inc.), and the like. The urethane resin (C2) may be one of them or a combination of two or more of them.

Based on 100 parts by weight of the total amount (C1+C2) of the acrylic resin (C1) and the urethane resin (C2) by solid content, a lower limit of the urethane resin (C2) content is 20 parts or more by weight preferably, and 30 parts or more by weight more preferably. Moreover, based on 100 parts by weight of the total amount (C1+C2), an upper limit of the urethane (C2) content is 90 parts or less by weight preferably, 80 parts by weight more preferably.

If the lower limit of the urethane resin (C2) content is less than 20 parts by weight, the color coating material (C) has an uneven flowability in forming the color coating layer (C). Further, the color coating layer (C) has a poor flexibility. On the other than, if the upper limit of the urethane resin (C2) content is more than 90 parts by weight, the color coating layer (C) has a low adhesion property with respect to the clear coating layer (B), whereby adhesion between the color coating layer (C) and the clear coating layer (B) becomes poor. The poor adhesion between these layers results in delamination between the color coating layer (C) and the clear coating layer (B). Moreover, if the upper limit of the urethane resin (C2) content is more than 90 parts by weight, the durability is reduced.

[3-3] Shinning Material (C3)

The shining material (C3) contains an aluminum flake at least, and may contains a component other than the aluminum flake.

The aluminum flake contains metal aluminum as its main component and may be in a powder form or a paste form. The use of the aluminum flake gives the laminate film having the metal tone or the metallic effect.

Of the laminate films of the present invention, the laminate film in the metal tone has the IV value of 350 or more, the SV value of 30 or more, and the FF value of 1.8 or more, as described above. In order to attain the metal tone, it is preferable to use an aluminum flake capable of giving the following IV value and SV value to the laminate film.

Provided that the aluminum flake makes it possible to attain the laminate film having the IV value, SV value, and the FF value, there is no particular limitation in the aluminum flake. However, a preferable aluminum flake is such a aluminum flake that an evaluation-use coating film (later described) containing the aluminum flake has a shining property and light scattering property higher than a predetermined level. The shining property and the light scattering property can be evaluated by an IV value and an SV value respectively measured by using a laser metallic appearance measuring apparatus alcope (Registered Trademark) LMR-200 (Product Name; made by Kansai Paint Co., Ltd.).

In the laminate film in the metal tone, a lower limit of the IV value evaluated by using the later-described coating film, is preferably 200 or more, and more preferably 250 or more. If the IV value is less than 200, it is impossible to obtain a laminate film having a metal-tone in its highlighted look.

In the laminate film in the metal tone, the SV value evaluated by using the later-described coating film, is preferably 120 or more, and more preferably 130 or more. If the SV value is less than 120, it is impossible to obtain a laminate film having a metal tone in its shaded look.

On the other hand, of the laminate films of the present invention, the laminate film in the metallic tone has the IV value of 200 or more, the SV value of 100 or more, and the FF value of 1.6 or more, as described above. In order to attain the metallic tone, it is preferable to use an aluminum flake capable of giving the following IV value and SV value to the laminate film.

In the laminate film in the metallic tone, a lower limit of the IV value evaluated by using the later-described coating film, is preferably 250 or more, and more preferably 300 or more. If the IV value is less than 250, it is impossible to obtain a laminate film having a metallic tone in its highlighted look.

In the laminate film in the metallic tone, the SV value evaluated by using the later-described coating film is preferably 85 or more, and more preferably 95 or more. If the SV value is less than 85, it is impossible to obtain a laminate film having a metallic tone in its shaded look.

The evaluation-use coating film used in the present invention is prepared by applying, on plastics, a aluminum-flake-containing coating material solution in which the aluminum flake is dispersed in an acrylic-based coating material solution (R241 coating material solution). Specifically, the evaluation-use coating film is prepared by carrying out the following steps.

First, the aluminum flake is added into the R241 coating material solution (made by Nippon Bee Chemical Co., Ltd) to a pigment weight concentration (PWC) of 15% by weight. The R241 coating material solution containing the aluminum flake and having the PWC of 15% by weight is then mixed until the aluminum flake is dispersed, thereby obtaining a dispersion solution. Thereafter, xylene is added to the dispersion solution to attain an aluminum-flake-containing coating material solution having a viscosity of 12 seconds at 25° C. (The viscosity is measured by using the NK#2 cup at 25° C.). Next, the aluminum-flake-containing coating material solution is sprayed onto a surface of ABS (acrylonitrile-butadine-stylene copolymer) plastics, so that drying of the aluminum-flake-containing coating material solution will give a film of 15 μm in thickness. Then, in a wet-on-wet manner, the R241 clear coating material is sprayed thereon, so that drying of the R241 clear coating material will give a film of 40 μm in thickness. After that, the thus prepared film is baked for 30 minutes at a temperature of 80° C. so as to dry the aluminum-flake-containing coating material solution and the R241 clear coating material applied on the aluminum-flake-containing coating material solution, thereby obtaining the evaluation-use coating film.

Further, it is preferable that the aluminum flake has an average particle diameter not less than 2 μm and not more than 50 μm. It is more preferable that the aluminum flake has an average particle diameter not less than 5 μm and not more than 35 μm. An aluminum flake having an average particle diameter less than 2 μm causes a low shining appearance, whereas an aluminum flake having an average particle diameter more than 50 μm likely causes "seed dirt under paint."

Specifically, examples of the aluminum flake for use in the laminate film in the metal tone are 65-388 alpaste (Registered Trademark), 7640 NS alpaste, 91-0621 alpaste, 91-4061 alpaste (which are all made by Toyo Aluminum K.K.), and the like. Moreover, examples of the aluminum flake for use in the laminate film in the metallic tone are 91-562 alpaste (solid content 71% by weight), 93-0647 alpaste (solid content 71% by weight), 97-0534 alpaste (solid content 72% by weight), MG-1000 alpaste (solid content 70% by weight) (which are all made by Toyo Aluminum K.K.), and the like.

Based on 100 parts by weight of the total amount (C1+C2) of the acrylic resin (C1) and the urethane resin (C2) by solid content, a lower limit of aluminum flake content is preferably 1 part or more by weight, and more preferably 5 parts or more by weight. Moreover, based on 100 parts by weight of the total amount (C1+C2), an upper limit of the aluminum flake content is preferably 30 parts or less by weight, and more preferably 20 parts or less by weight.

If the aluminum flake content is less than 1 part by weight, it becomes difficult to attain the laminate film having the aesthetic metal-tone or metallic-tone appearance. Moreover, if the aluminum flake content is more than 30 parts by weight, the color coating layer (C) has a low adhesion property with respect to the clear coating layer (B), whereby adhesion between the color coating layer (C) and the clear coating layer (B) becomes poor. Further, if the aluminum flake content is more than 30 parts by weight, a cohesion force of the color coating layer (C) is lowered.

Other than the aluminum flake, the shining material (C3) may contain, for example: a mica shining material such as interfering mica, white mica and the like; a metal shining material that is made of (i) a metal other than aluminum, (ii) an alloy, or (iii) the like, and that may be colored or non-colored. The shining material (C3) may contain one of those components, or may contain two or more of those components in combination. There is no particular limitation in how much the shining material (C3) can contain those components.

[3-4] Orientation Control Material (C4

The orientation control material (C4) is used for the laminate film in the metallic tone. The orientation control material (C4) controls orientation of the aluminum flake in the color coating film (C). The use of the orientation control material (C4) makes it possible to attain a laminate film having a metallic tone having a high SV value even in case where an aluminum flake having a low SV value is used.

There is no particular limitation in which type of the orientation control material (C4) is used. For example, an extender pigment and/or a resin bead. Examples of the extender pigment are talc, clay, kaolin, precipitated barium sulfate, and the like. Of those, talc is especially preferable.

Moreover, it is preferable that the resin bead is not less than 5 μm and not more than 50 μm in average particle diameter. it is more preferable that the resin bead is not less than 10 μm and not more than 30 μm in average particle diameter. A resin bead having an average particle diameter less than 5 μm does not give a sufficient orientation control effect. On the other hand, a resin bead having an average particle diameter more than 50 μm gives a rough surface (seeds) to the color coating layer (C).

Specifically, examples of the resin bead are: acrylic resin beads such as art pearl G800 transparent, art pearl G400BK (both of them are made by Negami Chemical Industrial Co., Ltd.), technopolymer MB, Techonopolymer EMA (both of them are made by Sekisui Plastic Co., Ltd.) and the like; urethane resin beans such as art pearl C800 (Negami Chemical Industrial Co., Ltd.) and the like; polyester resin beads; and the like.

A lower limit of orientation control material (C4) content is preferably 2 parts or more by weight, and more preferably 5 parts or more by weight, based on 100 parts by weight of the total amount (C1+C2), of the solid contents of the acrylic resin (C1) and the urethane resin (C2). Moreover, an upper limit of the orientation control material (C4) content is preferably 20 parts by weight or less by weight, and more preferably 15 parts or less by weight, based on 100 parts (C1+C2), by weight.

If the orientation control material (C4) content is less than 2 parts by weight, it becomes difficult to attain, especially, the laminate film having the aesthetic appearance in the metallic tone having the SV value. IF the orientation control material (C4) content is more than 20 parts by weight, the firm adhesion between the clear coating layer (B) and the color coating layer (C) is reduced, and the cohesion force of the color coating layer (C) is reduced.

[3-5] Other Component (C5)

In addition to the acrylic resin (C1), the urethane resin (C2), and the shining material (C3), and besides the orientation control material (C4), the color coating layer (C) may contains a compound that is usually added in a coating material.

The other component (C5) may be binder resin, a cross-linking agent, a pigment, a solvent, a ultraviolet absorbing agent (UVA), a light stabilizing agent (HALS), a leveling agent, a deforming agent, a conductive filler, or the like. The binder resin or cross-linking agent may be, for example, modified acrylic resin, polyester resin, epoxy resin, melamine resin, polyisocyanate compound, a block isocyanate compound, or the like. The solvent is an organic solvent that is generally used in coating materials. Examples of the solvent are: a solvent of a ester type, a solvent of ether type, a solvent of alcohol type, a solvent of amide type, a solvent of ketone type, a solvent of aliphatic hydrocarbon type, a solvent of cycloaliphatic hydrocarbon type, a solvent of aromatic hydrocarbon type, and the like solvent. The color coating layer (C) may be so arranged as to contain the solvent (the other component (C5)) that is one of these solvents or a combination of two or more of these solvents.

Furthermore, examples of the pigment are: (i) organic colored pigments such as a pigment of azo chelate compound type, a pigment of insoluble azo compound type, a pigment of a condensed azo compound type, a pigment of diketopyroropyrole type, a pigment of benzimidazolon type, a pigment of phthalocyanine type, a pigment of indigo type, a pigment of perylene type, a pigment of dioxane type, a pigment of quinacridone type, a pigment of isoindolynone, and the like pigment; inorganic colored pigments such as titanium dioxide, yellow iron oxide, chrome yellow, red oxide, carbon black, and the like; extender pigments such as talc, barium sulfate, calcium carbonate, and the like. The pigment may be one of these pigments or a combination of two or more of these pigments.

Moreover, as the leveling agent, BYK053 (made by BYK Chemy Japan Co., Ltd.) may be added.

There is no particular limitation in other component (C5) content.

[4] Adhesive Agent Layer

The adhesive agent layer is used for firmly adhering the laminate film on the surface of the article in making the decorative appearance of the article by the laminate film.

An adhesive agent to be contained in the adhesive agent layer is not particularly limited, provided that the adhesive agent is a known adhesive agent. For example, the adhesive agent may be byrone (Registered Trademark) UR3200 (Toyobo Co., Ltd.), UR-1361ET (Aron Ever-grip Co. Ltd.), and the like

[5] Inner Film Layer

An inner film layer is provided to the laminate film if necessary. The inner film layer prevents the adhesive agent layer from sticking with the guard film layer (A) while the laminate film is stored in a roll form. There is no particular limitation in which kind of inner film is used as the inner film layer. Examples of the inner film are: a polyethylene film, a polypropylene film, a co-extruded polyethylene/polypropylene film, a laminate polyethylene/polypropylene film, and a drawn polyethylenterephthalate film, and the like film.

Specific examples of the inner films are Tohcello (Registered Trademark) TAF-511 (made by Tohcello Co., Ltd.), BO-2500 (made by Toray Industries Inc.), and the like.

The inner film layer is peeled off in decorating the article. Thus, the inner film layer may have a surface that has been subjected to peel-off treatment, in order to be strippable (peeled off) appropriately.

The following will explain how to manufacture the laminate film having those layers.

In the present embodiment, the clear coating material and the color coating material dissolved in appropriate solvents are used. Thus, each component to be contained in the clear coating material is mixed into the appropriate solvent as described above, so as to prepare a clear coating material solution. Moreover, as to the color coating material, each component to be contained in the color coating material is mixed into the appropriate solvent, so as to prepare a color coating material solution.

Next, the clear coating material solution is applied onto the guard film layer (A) so that the clear coating layer (B) having the desired thickness will be obtained. There is no particular limitation in how to apply the clear coating material solution. For example, the clear coating material solution may be applied (i) by the spray coating in which a spray is used, (ii) by using an applicator, a bar coater, a die coater, a comma coater, a roller brush, a brush, a spatula, or the like (iii) or the like applying (coating) method. Of those, the use of the applicator is especially preferable to apply the clear coating material solution. A film thus prepared by applying the clear coating material solution by any one of those applying methods is dried by heating so as to evaporate the solvent from the clear coating material solution. Thereby, the clear coating layer (B) is formed.

Then, the color coating material solution is applied on the clear coating material layer (B) so that the color coating material layer (C) having the desired thickness will be obtained. There is no particular limitation in how to apply the color coating material solution. For example, the color coating material solution may be applied (i) by the spray coating in which a spray is used, (ii) by using the applicator, the bar coater, the die coater, the comma coater, the roller brush, the brush, the spatula, or the like (iii) or the like applying (coating) method. After the color coating material solution is applied, A film thus prepared by applying the color coating material solution in this way is dried by heating so as to evaporate the solvent from the color coating material solution. Thereby, the color coating layer (B) is formed.

It is preferable that the color coating material solution is applied with a shearing force. The shearing force refers to such an external force that causes a relative rubbing motion (relative sliding motion) between a surface of the clear coating layer (B) and that surface of the applicator which faces the surface of the clear coating layer (B). Specifically, it is preferable that the color coating material, that is, the color coating material solution is applied by sliding the applicator on the surface of the clear coating layer (B) with the applicator forced to be pressed onto the surface of the clear coating layer. By applying the color coating material solution in this way, a shear stress is given to the color coating solution that is being applied onto the surface of the clear coating layer (B).

Besides the applicator, for example, the die coater, the bar coater, a roll coater, the comma coater, and the like may be preferably used to apply the color coating material solution with the shearing force applied. By forming the color coating layer (B) by applying the color coating material with the shearing force applied, it is possible to give the laminate film the aesthetic metal-tone appearance and a better ornamental property.

Next, the adhesive agent is applied thereon so that the adhesive agent layer having the desired thickness will be attained. There is no particular limitation in how to apply the adhesive agent. For example, the adhesive agent may be applied (i) by the spray coating in which a spray is used, (ii) by using an applicator, a die coater, the bar coater, the roll coater, the comma coater, the roller brush, the brush, the spatula or the like, (iii) or the like applying (coating) method. The adhesive agent layer is obtained by drying the thus applied adhesive agent by heating. Then, if necessary, the inner film layer is formed by providing the inner film by using as a rubber role (roller) or the like. In this way, the laminate film of the present invention is obtained.

There is no particular limitation in how to make the decorative appearance of the article by using the laminate film thus prepared. Therefore, the making of the decorative appearance of the article may be carried out in the same way as a conventional well known art. Specifically, first, the inner film layer is peeled from the laminate film. Then, the laminate film is adhered on the surface of the article so that the laminate film will be firmly adhered with the surface of the article with no space therebetween. After that, in case where the clear coating layer (B) contains a reactive clear coating material, an electromagnetic wave is radiated thereon so as to cure the clear coating material. It is preferable that the adhering the laminate film on the article is carried out under vacuum.

In this way, the article having the decorative appearance is obtained, the article having the color coating layer (C) and the clear coating layer (B) on the surface of the article in this order, and the guard film layer (A) as a outermost layer.

Note that the laminate film of the present invention may be used in making a decorative appearance of any article requiring the metal-tone or metallic-tone ornamental property. For example, the laminate film of the present invention may be used for: automobile parts requiring the metal tone such as front grills, door grips, hubcaps, and the like; automobile parts requiring the metallic tone such as bumpers, front under spoilers, rear under spoilers, side under skirts, side garnishes, side mirrors; bodies of home electric appliances such as cell-phones, audio apparatuses, refrigerators, fan heaters, lighting apparatuses, and the like; wash stands, vanities, basins and the like; and the like.

The present invention will be described in detail with reference to Examples and Comparative Examples, to which the present invention is limited.

EXAMPLES

Example of Production of Laminate Film

Preparation of Clear Coating Material Solution

Acrylic-based resin (B1), urethane-based oligomer (B2), a multifunctional monomer (B3) were charged in a vessel provided with an agitating apparatus. Under agitation, a polymerization initiator (B4), a ultraviolet ray absorbing agent (UVA), a light stabilizing agent (HALS) were further added therein. Then, a solvent was added therein under agitation. The solvent contained toluene, ethyl acetate, and isopropyl alcohol in a ratio of 80:5:15 by weight. A mixture thus prepared was agitated for 30 minutes, thereby obtaining a clear coating material solution.

Preparation of Color Coating Material Solution

Acrylic resin (C1) and urethane resin (C2) were charged into a vessel provided with an agitating apparatus. Under agitation, an aluminum flake and a leveling agent were further added. Then, toluene was added as a solvent. After that, a mixture thus prepared was agitated for 30 minutes, thereby obtaining a color coating material solution. Note that, in case of obtaining the laminate film in the metallic tone, an orientation control material (C4) is added together with the aluminum flake.

Production of Laminate Film

The clear coating material solution was applied on a guard film layer (A) by using an applicator so that a clear coating layer (B) having a 40 μm thickness would be obtained on the guard film layer (A) after drying (hereinafter the thickness obtained after drying is referred to as "dry thickness"). The clear coating material solution thus applied was dried at a temperature of 80° C. for 15 minutes. Note that the lamination thus prepared by forming the clear coating layer (B) on the guard film layer (A) will be referred to as a (A+B) film hereinafter.

Next, on the clear coating layer (B) of the (A+B) film, the color coating material solution was applied with a shearing force by using an applicator in such a manner that a shearing stress is applied on the color coating material. The applying of the color coating material solution was carried out so that a color coating layer (C) having a dry thickness of 20 μm would be obtained. Thereafter, the color coating material solution thus applied was dried for 15 minutes at a temperature of 80° C., thereby forming the color coating layer (C). Note that, in case of obtaining a laminate film in the metal tone, the color coating material solution was applied, with the shearing force, by using the applicator, so that the color coating material would have a shearing stress.

Next, an adhesive agent (Biron UR-3200, made by Toyobo Co., Ltd.) was applied on the color coating layer (C) by using a bar coater so that an adhesive agent layer having a dry thickness of 10 μm will be obtained on the color coating layer (C). Then, the adhesive agent thus applied was dried for 15 minutes at a temperature of 80° C., thereby forming the adhesive agent layer. Finally, Tohcello TAF-511 (made by Tohcello Co. Ltd.) was provided thereon by using a rubber role, thereby forming the inner film layer. Thereby, a laminate film having the inner film was obtained.

Example of Production of Article Having Decorative Appearance by Using Laminate Film 1) Production of Article (X1) Having Decorative Appearance and UV-Cured Article (X2)

A base article (article) made of ABS was placed on a vertically-moving table provided in a both-side vacuum forming apparatus (Product Name: NGF-0912: made by Fu-se Vacuum Forming Co., Ltd.). The base article was 150 mm×50 mm×3 mm in size. The both-side vacuum forming apparatus was constituted of an upper box and a lower box.

After placing the base article on the vertically-moving table, the inner film layer was peeled off from the thus produced laminate film having the inner film layer. Then, the laminate film from which the inner film layer had been peeled off (hereinafter, this laminate film will be just referred to just as the laminate film), was placed in a sheet-clamping frame located above the base article (article) placed on the both-side vacuum forming apparatus. Next, an inside of the upper and lower boxes jointed together was vacuumed to 99.0 kPa in degree of vacuum. Then, the laminate film was heated to 90° C. by using a near-infrared ray heater. After that, the base article was elevated up so as to cause the base article to contact with the laminate film. The base article and the laminate film was held in contact for 5 seconds so as to be firmly adhered with each other with no space therebetween. After that, only the upper box was exposed to an atmospheric pressure. Thereby, the article (X1) having the decorative appearance by using the laminate film was obtained.

Further, a ultraviolet ray having a light intensity of 2000 mJ/cm² was radiated, from above the guard film layer (A), onto the article (X1) by using a high pressure mercury lamp of 80 W/cm², so as to cure the clear coating material of the clear coating layer (B), thereby obtaining the UV (Ultraviolet ray)-cured article (X2).

2) Production of Article (Y1) Having Decorative Appearance and UV-Cured Article (Y2)

An article (Y1) having the decorative appearance and a UV-cured article (Y2) were produced in the way used in 1), except that a semispherical-shaped base article made of ABS having a diameter of 150 mm was used in replacement of the base article used in 1).

Evaluation of Guard Film Layer (A)

A guard film used as the guard film layer (A) was cut into a size of 10 mm×50 mm and evaluated in terms of (i) after-tearing elongation (%) and (ii) tensile strength (kg/cm²).

Specifically, by using Tensilon HTM-500 (Product Name; Made by Toyo Baldwin Co., Ltd.), the guard film in the size was pulled at a pulling rate of 50 mm/min at a temperature of 20° C. Elongation of the guard film when the guard film was torn was determined as the after-tearing elongation (%), and a force applied on the guard film when the guard film was torn was determined as the tensile strength.

Evaluation of Clear Coating Layer (B)

The clear coating layer (B) was evaluated in the following points.

Evaluation in Non-tackiness Property of Surface

The (A+B) film was dried at 80° C. for 15 minutes, the (A+B) film having been thus prepared by drying the clear coating solution to form the clear coating layer (B) on the guard film layer (A). Then, the (A+B) film thus dried was kept at a temperature of 25° C. for 5 minutes. After that, the (A+B) film was evaluated as to whether or not the surface of the clear coating layer (B) was tacky (sticky). The evaluation was carried out by touching the surface of the clear coating layer (B) with a finger. If the surface was not tacky, it was judged that the (A+B) film was "pass" (○), because the surface was not tacky. If the surface was tacky, it was judged that the (A+B) film was "fail" (x), because the surface was tacky.

Evaluation in Mar Resistance

By using a high-pressure mercury lamp of 80 W/cm², a ultraviolet ray having a light intensity of 2000 mJ/cm² was radiated onto the (A+B) film, thereby obtaining a cured (A+B) film.

On the clear coating layer (B) of the cured (A+B) film thus prepared, eight piled gauzes were placed. Then, on top of the gauzes, a weight of 500 g was placed. The cured (A+B) film on which the gauzes and the weight were placed were moved back and forth 100 times in a mar testing machine. After that, a surface of the clear coating layer (B) was observed visually. If no damage was found on the surface of the clear coating layer (B) by the visual observation, it was judged that the cured (A+B) film was "pass" (○). If a damage was found on the surface of the clear coating layer (B) by the visual observation, it was judged that the cured (A+B) film was "fail" (x).

Evaluation in Universal Hardness

By using Fischer scope H-100 (made by Fischer Instruments K.K.), a maximum depth of push-down concave shape of the clear coating layer (B) was measured. The push-down concave shape of the clear coating layer (B) was formed by placing a weight load to add a weight of 5 mN on the surface of the clear coating layer of the cured (A+B) film for 30 seconds at a temperature of 25° C. A hardness was calculated from the maximum depth thus obtained, thereby determining the universal hardness (N/mm²).

Evaluation of After-Tearing Elongation and Tensile Strength

The clear coating layer (B) before curing the clear coating material was evaluated in after-tearing elongation (%) in the following manner. Further, the clear coating layer (B) after curing the clear coating material was evaluated in after-tearing elongation (%) and tensile strength (kg/cm²) in the following manner.

1) Evaluation of After-Tearing Elongation of Clear Coating Layer (B) Before Curing Clear Coating Material The clear coating material solution was applied on a lumilar (Registered Trademark) S-10 (made by Toray Industries Inc.) so that the clear coating layer (B) having a 40 μm thickness would be obtained after dried. Then, the clear coating material solution thus applied was dried at 80° C. for 15 minutes, thereby obtaining a dry sample. The dry sample was cut into a size of 10 mm×50 mm. Further, the lumilar S-10 was peeled off, thereby obtaining an uncured sample having the clear coating layer (B) in which the clear coating material had not been cured.

Next, the after-tearing elongation of the uncured sample was evaluated by using the above-mentioned Tensilon HTM-500. The after-tearing elongation was measured when the uncured sample was torn by being pulled at 80° C. and at a pulling rate of 50 mm/min, until tear.

2) Evaluation of After-Tearing Elongation and Tensile Strength of Clear Coating Layer (B) After Curing Clear Coating Material The lumilar S-10 was placed on the clear coating material of the dry sample. Then, by using a high-pressure mercury lamp of 80 W/cm², a ultraviolet ray having a light intensity of 2000 mJ/cm² was irradiated on the dry sample on which the lumilar S-10 was placed. Thereby, obtained was the cured sample having the clear coating layer (B) in which the clear coating material had been cured. Then, the cured sample was cut into a size of 10 mm×50 mm, and the lumilar S-10 were peeled off from both sides of the clear coating layer (B), thereby obtaining a tensile strength-evaluation-use sample.

Next, as in the uncured sample, by using the above-mentioned Tensilon HTM-500, the tensile strength-evaluation-use sample was evaluated in terms of the after-tearing elongation. The after-elongation was measured when the tensile strength-evaluation-use sample was torn by being pulled at 20° C. and at a pulling rate of 50 mm/min, until tear. Further, a force that was applied on the tensile strength-evaluation-use sample when the tensile strength-evaluation-use was torn was determined as the tensile strength.

Evaluation of Aluminum Flake

Prepared was an evaluation-use film containing the aluminum flake that the color coating material solution contains. The evaluation-use film was measured in the IV value, SV value, and FF value by using a laser metallic appearance measuring instrument alcope LMR-200 (Product Name: Kansai Paint Co., Ltd.)

Preparation of Evaluation-use Film

Under agitation, the aluminum flake was added into a R241 coating material solution (made by Nippon Bee Chemical Co., Ltd.) to a pigment weight concentration (PWC) of 15% by weight, thereby obtaining a dispersion solution in which the aluminum flake was dispersed. After that, xylene was added into the dispersion solution so as to attain such a viscosity of 12 seconds measured at 25° C. by using the NK#2 cup. Thereby, an aluminum-flake-containing coating material solution was obtained.

Next, the aluminum-flake-containing coating material solution was sprayed onto a surface of a base article of ABS (acrylonitrile-butadine-stylene) copolymer plastics so that drying of the aluminum-flake-containing coating material solution would give a film of 15 μm in thickness. Then, in a wet-on-wet manner, the R241 clear coating material was sprayed thereon, so that drying of the R241 clear coating material would give a film of 40 μm in thickness. After that, the thus prepared film was baked for 30 minutes at a temperature of 80° C. so as to dry the aluminum-flake-containing coating material solution and the R241 clear coating material, thereby obtaining the evaluation-use coating film having a thickness of 55 μm.

Measurement of IV Value, SV Value, and FF Value

The IV value, SV value, and FF value of the evaluation-use coating film were measured in accordance with the manual of the alcope LMR-200.

Evaluation of Viscosity of Color Coating Material

The color coating material solution prepared as above was charged in a predetermined container. Viscosity of the color coating material solution was measured at 25° C. by using a B-type viscometer RC100 (made by Toki Sangyo Co., Ltd.) with a rotating number 30 rpm.

Evaluation of Article Having Decorative Appearance by Using Laminate Film

The article having the decorative appearance by using the laminate film was evaluated in the following points.

Evaluation of IV Value, SV Value, and FF Value

The thus prepared UV cured article (X2) from which the guard film layer had been peeled off, was measured in terms of the IV value, SV value, and FF value by using the alcope LMR-200. The IV value, SV value, and FF value were measured with respect to the clear coating layer (B) of the UV cured article (X2).

Standard values for the metal tone are: IV value=350, SV value=30, and FF value=1.8. If measurement values were equal to or higher than the standard values, it was judged that the UV cured article (X2) was in metal tone and "pass".

Standard values for the metallic tone are: IV value=200, SV value=100, and FF value=1.6. If measurement values were equal to or higher than the standard values, it was judged that the UV cured article (X2) was in metallic tone and "pass".

Evaluation of Appearance

Each UV cured article (X2, Y2) which was prepared from the laminate film in the metal tone, and from which the guard film (A) had been peeled, was visually evaluated as to (1) whether or not the UV cured articles (X2, Y2) had the metal-tone appearance, and (2) whether or not the UV cured articles (X2, Y2) had a smooth surface.

If the appearance was in the metal tone and the surface was smooth, the UV cured articles (X2, Y2) were judged as "pass" (○). If either (1) or (2) is not satisfied, the UV cured articles (X2, Y2) were judged as "fail" (x).

Evaluation of Firm Adhesion Property

The surface of the clear coating layer (B) of the thus prepared UV cured article (X2) from which the guard film layer (A) had been peeled, was subjected to a firm adhesion test that followed the JIS K-5400-8.5. "cross-hatch method". If the clear coating layer (B) had no defect such as peeling, chip edge, and the like, it was judged that the clear coating layer (B) was "pass" (○). If the clear coating layer (B) had such defect, it was judged that the clear coating layer (B) was "fail" (x).

Evaluation of Durability

The thus prepared UV cured article (X2) from which the guard film layer (A) had been peeled off was subjected to a sunshine weatherometer test for 1000 hours, from the clear coating layer (B) side. Then, the surface of the UV cured article (X2) was compared by visual inspection before and after the sunshine weatherometer test, in terms of gloss, color, and cracks.

If the surface of the UV cured article (X2) after the test had no defect in terms of any one of the gloss, color and cracks compared with before the test, it was judged that the UV cured article (X2) was not "pass" (○). If the surface of the UV cured article (X2) after the test had any defect in terms of at least one of the gloss, color and cracks compared with before the test, it was judged that the UV cured article (X2) was "fail" (x).

Evaluation of Shape-Forming Property

Visual evaluation was conducted on the clear coating layer (B) and the color coating layer (C) of the thus prepared article (Y1), in terms of evenness in flowability, evenness in thickness, and reproducibility of the shape of the base article.

If both of the clear coating layer (B) and the color coating layer (C) had no defect in terms of evenness in flowability, evenness in thickness, and reproducibility of the shape of the base article, it was judged that the article (Y1) was not "pass" (○). If the clear coating layer (B) and/or the color coating layer (C) had any defect in terms of any of evenness in flowability, evenness in thickness, and reproducibility of the shape of the base article, it was judged that the article (Y1) was "fail" (x).

In the following, the present invention is descried with reference to the examples and the comparative examples. Examples 1 to 8 and Comparative examples 1 to 6 relate to the laminate film in the metal tone, whereas Examples 9 to 17, Reference Example, and Comparative Examples 7 to 11 relate to the laminate film in the metallic tone.

Examples 1 to 3

Laminate Film in Metal Tone

In the manner described above, laminate films were prepared from [a] a guard film layer (A), [b] a clear coating material solution, [c] a color coating material solution listed in Table 1. Articles having decorative appearances were prepared by using the laminate films respectively. Each evaluation mentioned above was carried out for those laminate films and the articles. Results are shown in Table 3. Moreover, IV values, SV values, and FF values of evaluation-use coating films containing aluminum flakes to be contained in color coating material solutions are shown in Table 19.

Note that in Table 3 and later described Table 5, Table 8 and Table 11, the symbol "<" indicates IV values higher than 400, and FF values higher than 2.0, which were immeasurable by the alcope LMR-200. Thus, the symbol "<" indicates that the reading of the measurement was out of measurable range of the alcope LMR-200.

Moreover, Tables 19 and 20 show details in materials from which the laminate films were made in the present Examples, the later described Examples and Comparative Examples.

Comparative Examples 1 to 3

In the manner described above, laminate films were prepared from [a] a guard film layer (A), [b] a clear coating material solution, [c] a color coating material solution listed in Table 2. Articles having decorative appearances were prepared by using the laminate films respectively. Each evaluation mentioned above was carried out for those laminate films and the articles. Results are shown in Table 3. Moreover, IV values, SV values, and FF values of evaluation-use coating films containing aluminum flakes to be contained in color coating material solutions are shown in Table 19.

Examples 4 and 5

Laminate Film in Metal Tone

In the manner described above, laminate films were prepared from [a] a guard film layer (A), [b] a clear coating material solution, [c] a color coating material solution listed in Table 4. Articles having decorative appearances were prepared by using the laminate films respectively. Each evaluation mentioned above was carried out for those laminate films and the articles. Results are shown in Table 5. Moreover, IV values, SV values, and FF values of evaluation-use coating films containing aluminum flakes to be contained in color coating material solutions are shown in Table 19.

Examples 6 to 8

Laminate Film in Metal Tone

In the manner described above, laminate films were prepared from [a] a guard film layer (A), [b] a clear coating material solution, [c] a color coating material solution listed in Table 6. Articles having decorative appearances were prepared by using the laminate films respectively. Each evaluation mentioned above was carried out for those laminate films and the articles. Results are shown in Table 8. Moreover, IV values, SV values, and FF values of evaluation-use coating films containing aluminum flakes to be contained in color coating material solutions are shown in Table 19.

Comparative Examples 4 to 6

In the manner described above, laminate films were prepared from [a] a guard film layer (A), [b] a clear coating material solution, [c] a color coating material solution listed in Table 7. Articles having decorative appearances were prepared by using the laminate films respectively. Each evaluation mentioned above was carried out for those laminate films and the articles. Results are shown in Table 8. Moreover, IV values, SV values, and FF values of evaluation-use coating films containing aluminum flakes to be contained in color coating material solutions are shown in Table 19.

Example 9 to 11

Laminate Film in Metallic Tone

In the manner described above, laminate films were prepared from [a] a guard film layer (A), [b] a clear coating material solution, [c] a color coating material solution listed in Table 9. Articles having decorative appearances were prepared by using the laminate films respectively. Each evaluation mentioned above was carried out for those laminate films and the articles. Results are shown in Table 11.

Comparative Examples 7 and 8

In the manner described above, laminate films were prepared from [a] a guard film layer (A), [b] a clear coating material solution, [c] a color coating material solution listed in Table 10. Articles having decorative appearances were prepared by using the laminate films respectively. Each evaluation mentioned above was carried out for those laminate films and the articles. Results are shown in Table 11.

Examples 12 and 13

Laminate Film in Metallic Tone

In the manner described above, laminate films were prepared from [a] a guard film layer (A), [b] a clear coating material solution, [c] a color coating material solution listed in Table 12. Articles having decorative appearances were prepared by using the laminate films respectively. Each evaluation mentioned above was carried out for those laminate films and the articles. Results are shown in Table 13.

Reference Example

Example 14

Laminate Film in Metallic Tone

In the manner described above, laminate films were prepared from [a] a guard film layer (A), [b] a clear coating material solution, [c] a color coating material solution listed in Table 14. Articles having decorative appearances were prepared by using the laminate films respectively. Each evaluation mentioned above was carried out for those laminate films and the articles. Results are shown in Table 15.

Examples 15 to 17

Laminate Film in Metallic Tone

In the manner described above, laminate films were prepared from [a] a guard film layer (A), [b] a clear coating material solution, [c] a color coating material solution listed in Table 16. Articles having decorative appearances were prepared by using the laminate films respectively. Each evaluation mentioned above was carried out for those laminate films and the articles. Results are shown in Table 18.

Comparative Example 9 to 11

In the manner described above, laminate films were prepared from [a] a guard film layer (A), [b] a clear coating material solution, [c] a color coating material solution listed in Table 17. Articles having decorative appearances were prepared by using the laminate films respectively. Each evaluation mentioned above was carried out for those laminate films and the articles. Results are shown in Table 18.

TABLE 1

| | Example 1 | | Example 2 | | Example 3 | |
|---|---|---|---|---|---|---|
| | Amount (g) | SC. wt. (g) | Amount (g) | SC. wt. (g) | Amount (g) | SC. wt. (g) |
| [c] Color Coating Material Solution | | | | | | |
| C1: Acrylic resin | | | | | | |
| NBC2050-55 | 72.7 | 40.0 | 72.7 | 40.0 | 72.7 | 40.0 |
| C2: Urethane resin | | | | | | |
| XE-75-H40 | 171.4 | 60.0 | 171.4 | 60.0 | 171.4 | 60.0 |
| C3: Shining material | | | | | | |
| 91-4061 Alpaste | 15.0 | 10.7 | 15.0 | 10.7 | 15.0 | 10.7 |
| C5: Other component | | | | | | |
| Leveling agent BYK053 | 2.0 | 2.0 | 2.0 | 2.0 | 2.0 | 2.0 |
| Toluene | 75.0 | — | 60.0 | — | 35.0 | — |
| Total Amount | 336.1 | 112.7 | 321.1 | 112.7 | 296.1 | 112.7 |
| SC. by wt. (%) | 33.5 | — | 35 | — | 38 | — |
| [b] Clear Coating Material Solution | | | | | | |
| B1: Acrilic-based resin | | | | | | |
| MR8319 | 100.0 | 50.0 | 100.0 | 50.0 | 100.0 | 50.0 |

TABLE 1-continued

| | Example 1 | | Example 2 | | Example 3 | |
|---|---|---|---|---|---|---|
| | Amount (g) | SC. wt. (g) | Amount (g) | SC. wt. (g) | Amount (g) | SC. wt. (g) |
| B2: Urethane-based Oligomer | | | | | | |
| Ebecril EB8804/10EA | 50.0 | 45.0 | 50.0 | 45.0 | 50.0 | 45.0 |
| B3: Multifunctional Monomer | | | | | | |
| Kayarad DPCA20 | 2.5 | 2.5 | 2.5 | 2.5 | 2.5 | 2.5 |
| NK ester 2G | 2.5 | 2.5 | 2.5 | 2.5 | 2.5 | 2.5 |
| B4: Polymerization initiator | | | | | | |
| Ilgacure-819 | 3.0 | 3.0 | 3.0 | 3.0 | 3.0 | 3.0 |
| B5: Other Component | | | | | | |
| UVA: Tinubin 400 | 2.5 | 2.5 | 2.5 | 2.5 | 2.5 | 2.5 |
| HALS: Sanol LS292 | 1.5 | 1.5 | 1.5 | 1.5 | 1.5 | 1.5 |
| *1Solvent | 92.8 | — | 92.8 | — | 92.8 | — |
| Total Amount | 254.8 | 107.0 | 254.8 | 107.0 | 254.8 | 107.0 |
| SC. by wt. (%) | 42 | — | 42 | — | 42 | — |
| [a] Guard Film Layer (A) | | | | | | |
| Nova clear SG007 | — | | Use | | Use | |
| Opulent TPX-X44B | Use | | — | | — | |

*1Solvent: toluene, ethyl acetate, and isopropyl alcohol in a ratio of 80:5:15 by weight
Abbreviation:
SC. wt: Solid Content weight
SC. by wt: Solid Content by weight

TABLE 2

| | Comparative Example 1 | | Comparative Example 2 | | Comparative Example 3 | |
|---|---|---|---|---|---|---|
| | Amount (g) | SC. wt. (g) | Amount (g) | SC. wt. (g) | Amount (g) | SC. wt. (g) |
| [c] Color Coating Material Solution | | | | | | |
| C1: Acrylic resin | | | | | | |
| NBC2050-55 | 72.7 | 40.0 | 72.7 | 40.0 | 72.7 | 40.0 |
| C2: Urethane resin | | | | | | |
| XE-75-H40 | 171.4 | 60.0 | 171.4 | 60.0 | 171.4 | 60.0 |
| C3: Shining material | | | | | | |
| 91-4061 Alpaste | 15.0 | 10.7 | 15.0 | 10.7 | — | — |
| 52-509 Alpaste | — | — | — | — | 15.0 | 9.8 |
| C5: Other component | | | | | | |
| Leveling agent BYK053 | 2.0 | 2.0 | 2.0 | 2.0 | 2.0 | 2.0 |
| Toluene | 60.0 | — | 0 | — | 60.0 | — |
| Total Amount | 321.1 | 112.7 | 261.1 | 112.7 | 321.1 | 111.8 |
| SC. by wt. (%) | 35 | — | 43 | — | 35 | — |
| [b] Clear Coating Material Solution | | | | | | |
| B1: Acrilic-based resin | | | | | | |
| MR8319 | 100.0 | 50.0 | 100.0 | 50.0 | 100.0 | 50.0 |
| B2: Urethane-based Oligomer | | | | | | |
| Ebecril EB8804/10EA | 50.0 | 45.0 | 50.0 | 45.0 | 50.0 | 45.0 |

TABLE 2-continued

|  | Comparative Example 1 | | Comparative Example 2 | | Comparative Example 3 | |
|---|---|---|---|---|---|---|
|  | Amount (g) | SC. wt. (g) | Amount (g) | SC. wt. (g) | Amount (g) | SC. wt. (g) |
| B3: Multifunctional Monomer |  |  |  |  |  |  |
| Kayarad DPCA20 | 2.5 | 2.5 | 2.5 | 2.5 | 2.5 | 2.5 |
| NK ester 2G | 2.5 | 2.5 | 2.5 | 2.5 | 2.5 | 2.5 |
| B4: Polymerization initiator |  |  |  |  |  |  |
| Ilgacure-819 | 3.0 | 3.0 | 3.0 | 3.0 | 3.0 | 3.0 |
| B5: Other Component |  |  |  |  |  |  |
| UVA: Tinubin 400 | 2.5 | 2.5 | 2.5 | 2.5 | 2.5 | 2.5 |
| HALS: Sanol LS292 | 1.5 | 1.5 | 1.5 | 1.5 | 1.5 | 1.5 |

TABLE 2-continued

|  | Comparative Example 1 | | Comparative Example 2 | | Comparative Example 3 | |
|---|---|---|---|---|---|---|
|  | Amount (g) | SC. wt. (g) | Amount (g) | SC. wt. (g) | Amount (g) | SC. wt. (g) |
| *[1]Solvent | 92.8 | — | 92.8 | — | 92.8 | — |
| Total Amount | 254.8 | 107.0 | 254.8 | 107.0 | 254.8 | 107.0 |
| SC. by wt. (%) | 42 | — | 42 | — | 42 | — |
| [a] Guard Film Layer (A) | | | | | | |
| Nova clear SG007 | Use | | Use | | Use | |

*[1]Solvent: toluene, ethyl acetate, and isopropyl alcohol in a ratio of 80:5:15 by weight
Abbreviation:
SC. wt: Solid Content weight
SC. by wt: Solid Content by weight

TABLE 3

|  | Example | | | Comparative Example | | |
|---|---|---|---|---|---|---|
|  | 1 | 2 | 3 | 1 | 2 | 3 |
| Guard Film Layer (A) | | | | | | |
| A.T.E. (%) | 400≦ | | | 400≦ | | |
| T.S. (kg/cm$^2$) | 72 | | | 90 | | |
| Clear Coating Layer (B) | | | | | | |
| Surface Non-tackiness | ○ | | | ○ | | |
| Scratch Resistance | ○ | | | ○ | | |
| Hardness (N/mm$^2$) | 150 | | | 150 | | |
| <Uncured Sample> | | | | | | |
| A.T.E. (%) | | 480 | | | | |
| <Cured Sample> | | | | | | |
| A.T.E. (%) | | 7 | | | | |
| T.S. (kg/cm$^2$) | | 530 | | | | |
| Color Coating Layer (C) | | | | | | |
| Viscosity (mPa·S) | 1,500 | 2,000 | 4,500 | 2,000 | 7,000 | 2,000 |
| Shearing Force |  | with |  | *[3] without |  | with |
| Urea Bond Amount (mmol/g) |  |  |  | 0.70 |  |  |
| Tg of Acrylic Resin(° C.) |  |  |  | 50 |  |  |
| Article having the decorative appearance | | | | | | |
| *[2]IV value | 400< | 400< | 400< | 200 | 300 | 400< |
| *[2]SV value | 50 | 40 | 30 | 80 | 20 | 20 |
| *[2]FF value | 2.0< | 2.0< | 2.0< | 1.4 | 1.6 | 2.0< |
| *[4]Appearance | ○ | ○ | ○ | (i) x | (ii) x | (i) x |
| Adhesion | ○ | ○ | ○ | ○ | ○ | ○ |
| Durability | ○ | ○ | ○ | ○ | ○ | ○ |
| Shape-Forming Property | ○ | ○ | ○ | ○ | ○ | ○ |

*[2]Standard values for Metal Tone: IV value = 350, SV value = 30, FF value = 1.8
*[3]Applied by Spray Coating
*[4](i) Evaluation for metal tone (ii) Evaluation for surface smoothness
Abbreviation:
A.T.E.: After-tearing Elongation
T.S.: Tensile strength

TABLE 4

|  | Example 4 | | Example 5 | |
|---|---|---|---|---|
|  | Amount (g) | SC. wt. (g) | Amount (g) | SC. wt. (g) |
| [c] Color Coating Material Solution | | | | |
| C1: Acrylic resin | | | | |
| NBC 2058 | 140.0 | 70.0 | — | — |
| ACR 9013 | — | — | 40.0 | 20.0 |
| C2: Urethane resin | | | | |
| XE-75-H3 | 120.0 | 30.0 | — | — |
| XE-75-H29 | — | — | 320.0 | 80.0 |
| C3: Shining material | | | | |
| 91-4061 Alpaste | 15.0 | 10.7 | 15.0 | 10.7 |
| C5: Other component | | | | |
| Leveling agent BYK053 | 2.0 | 2.0 | 2.0 | 2.0 |
| Toluene | 45.0 | — | 0 | — |
| Total Amount | 322.0 | 112.7 | 377.0 | 112.7 |
| SC. by wt. (%) | 35 | — | 30 | — |
| [b] Clear Coating Material Solution | | | | |
| B1: Acrilic-based resin | | | | |
| MR8319 | 70.0 | 35.0 | 130.0 | 65.0 |
| B2: Urethane-based Oligomer | | | | |
| Ebecril EB8804/10EA | 72.2 | 65.0 | 33.3 | 30.0 |
| B3: Multifunctional Monomer | | | | |
| Kayarad DPCA20 | 0 | 0 | 2.5 | 2.5 |
| NK ester 2G | 0 | 0 | 2.5 | 2.5 |
| B4: Polymerization initiator | | | | |
| Ilgacure-819 | 3.0 | 3.0 | 3.0 | 3.0 |
| B5: Other Component | | | | |
| UVA: Tinubin 400 | 2.5 | 2.5 | 2.5 | 2.5 |
| HALS: Sanol LS292 | 1.5 | 1.5 | 1.5 | 1.5 |
| [1]Solvent | 105.6 | — | 79.5 | — |
| Total Amount | 254.8 | 107.0 | 254.8 | 107.0 |
| SC. by wt. (%) | 42 | — | 42 | — |
| [a] Guard Film Layer (A) | | | | |
| Nova clear SG007 | — | | Use | |
| Opulent TPX-X44B | Use | | — | |

[1]Solvent: toluene, ethyl acetate, and isopropyl alcohol in a ratio of 80:5:15 by weight
Abbreviation:
SC. wt: Solid Content weight
SC. by wt: Solid Content by weight

TABLE 5

|  | Example 4 | Example 5 |
|---|---|---|
| Guard Film Layer (A) | | |
| A.T.E. (%) | 400≦ | 400≦ |
| T.S. (kg/cm$^2$) | 72 | 90 |
| Clear Coating Layer (B) | | |
| Surface Non-tackiness | ○ | ○ |
| Scratch Resistance | ○ | ○ |
| Hardness (N/mm$^2$) | 120 | 140 |
| <Uncured Sample> | | |
| A.T.E. (%) | 600 | 410 |
| <Cured Sample> | | |
| A.T.E. (%) | 15 | 9 |
| T.S. (kg/cm$^2$) | 400 | 460 |
| Color Coating Layer (C) | | |
| Viscosity (mPa · S) | 1,500 | 2,000 with |
| Shearing Force | | |
| Urea Bond Amount (mmol/g) | 0.98 | 0.56 |
| Tg of Acrylic Resin (° C.) | 70 | 10 |
| Article having the decorative appearance | | |
| [2]IV value | 350 | 400< |
| [2]SV value | 50 | 40 |
| [2]FF value | 1.8 | 2.0< |
| Appearance | ○ | ○ |
| Adhesion | ○ | ○ |
| Durability | ○ | ○ |
| Shape-Forming Property | ○ | ○ |

[2]Standard values for Metal Tone: IV value = 350, SV value = 30, FF value = 1.8
Abbreviation:
A.T.E.: After-tearing Elongation
T.S.: Tensile strength

TABLE 6

|  | Example 6 | | Example 7 | | Example 8 | |
|---|---|---|---|---|---|---|
|  | Amount (g) | SC. wt. (g) | Amount (g) | SC. wt. (g) | Amount (g) | SC. wt. (g) |
| [c] Color Coating Material Solution | | | | | | |
| C1: Acrylic resin | | | | | | |
| NBC2050-55 | 72.7 | 40.0 | 72.7 | 40.0 | 72.7 | 40.0 |
| C2: Urethane resin | | | | | | |
| XE-75-H40 | 171.4 | 60.0 | 171.4 | 60.0 | 171.4 | 60.0 |
| C3: Shining material | | | | | | |
| 91-4061 Alpaste | 15.0 | 10.7 | 15.0 | 10.7 | 15.0 | 10.7 |
| C5: Other component | | | | | | |
| Leveling agent BYK053 | 2.0 | 2.0 | 2.0 | 2.0 | 2.0 | 2.0 |
| Toluene | 60.0 | — | 60.0 | — | 60.0 | — |
| Total Amount | 321.1 | 112.7 | 321.1 | 112.7 | 321.1 | 112.7 |
| SC. by wt. (%) | 35 | — | 35 | — | 35 | — |
| [b] Clear Coating Material Solution | | | | | | |
| B1: Acrilic-based resin | | | | | | |
| MR8319 | 90.0 | 45.0 | — | — | — | — |
| BR77 | — | — | 50.0 | 50.0 | — | — |
| BR82 | — | — | — | — | 50.0 | 50.0 |
| B2: Urethane-based Oligomer | | | | | | |
| Ebecril EB8804/10EA | 27.8 | 25.0 | 44.4 | 40.0 | 44.4 | 40.0 |
| B3: Multifunctional Monomer | | | | | | |
| Kayarad DPCA20 | 15.0 | 15.0 | 5.0 | 5.0 | 5.0 | 5.0 |
| NK ester 2G | 15.0 | 15.0 | 5.0 | 5.0 | 5.0 | 5.0 |

TABLE 6-continued

|  | Example 6 | | Example 7 | | Example 8 | |
|---|---|---|---|---|---|---|
|  | Amount (g) | SC. wt. (g) | Amount (g) | SC. wt. (g) | Amount (g) | SC. wt. (g) |
| B4: Polymerization initiator |  |  |  |  |  |  |
| Ilgacure-819 | 3.0 | 3.0 | 3.0 | 3.0 | 3.0 | 3.0 |
| B5: Other Component |  |  |  |  |  |  |
| UVA: Tinubin 400 | 2.5 | 2.5 | 2.5 | 2.5 | 2.5 | 2.5 |
| HALS: Sanol LS292 | 1.5 | 1.5 | 1.5 | 1.5 | 1.5 | 1.5 |
| *[1]Solvent | 100.0 | — | 143.4 | — | 143.4 | — |
| Total Amount | 254.8 | 107.0 | 254.8 | 107.0 | 254.8 | 107.0 |
| SC. by wt. (%) | 42 | — | 42 | — | 42 | — |
| [a] Guard Film Layer (A) | | | | | | |
| Nova clear SG007 | Use | | Use | | Use | |

*[1]Solvent: toluene, ethyl acetate, and isopropyl alcohol in a ratio of 80:5:15 by weight
Abbreviation:
SC. wt: Solid Content weight
SC. by wt: Solid Content by weight

TABLE 7

|  | Comparative Example 4 | | Comparative Example 5 | | Comparative Example 6 | |
|---|---|---|---|---|---|---|
|  | Amount (g) | SC. wt. (g) | Amount (g) | SC. wt. (g) | Amount (g) | SC. wt. (g) |
| [c] Color Coating Material Solution | | | | | | |
| C1: Acrylic resin |  |  |  |  |  |  |
| NBC2050-55 | 72.7 | 40.0 | 9.1 | 5.0 | 9.1 | 5.0 |
| C2: Urethane resin |  |  |  |  |  |  |
| XE-75-H40 | 171.4 | 60.0 | 271.4 | 95.0 | 271.4 | 95.0 |
| C3: Shining material |  |  |  |  |  |  |
| 91-4061 Alpaste | 15.0 | 10.7 | 15.0 | 10.7 | 15.0 | 10.7 |
| C5: Other component |  |  |  |  |  |  |
| Leveling agent BYK053 | 2.0 | 2.0 | 2.0 | 2.0 | 2.0 | 2.0 |
| Toluene | 60.0 | — | 24.5 | — | 24.5 | — |
| Total Amount | 321.1 | 112.7 | 322.0 | 112.7 | 322.0 | 112.7 |
| SC. by wt. (%) | 35 | — | 35 | — | 35 | — |
| [b] Clear Coating Material Solution | | | | | | |
| B1: Acrilic-based resin |  |  |  |  |  |  |
| MR8319 | 40.0 | 20.0 | 100.0 | 50.0 | 100.0 | 50.0 |
| B2: Urethane-based Oligomer |  |  |  |  |  |  |
| Ebecril EB8804/10EA | 88.9 | 80.0 | 50.0 | 45.0 | 50.0 | 45.0 |
| B3: Multifunctional Monomer |  |  |  |  |  |  |
| Kayarad DPCA20 | 0 | 0 | 2.5 | 2.5 | 2.5 | 2.5 |
| NK ester 2G | 0 | 0 | 2.5 | 2.5 | 2.5 | 2.5 |
| B4: Polymerization initiator |  |  |  |  |  |  |
| Ilgacure-819 | 3.0 | 3.0 | 3.0 | 3.0 | 3.0 | 3.0 |
| B5: Other Component |  |  |  |  |  |  |
| UVA: Tinubin 400 | 2.5 | 2.5 | 2.5 | 2.5 | 2.5 | 2.5 |
| HALS: Sanol LS292 | 1.5 | 1.5 | 1.5 | 1.5 | 1.5 | 1.5 |
| Solvent*[1] | 118.9 | — | 92.8 | — | 92.8 | — |
| Total Amount | 254.8 | 107.0 | 254.8 | 107.0 | 254.8 | 107.0 |
| SC. by wt. (%) | 42 | — | 42 | — | 42 | — |
| [a] Guard Film Layer (A) | | | | | | |
| Nova clear SG007 | Use | | Use | | — | |
| Fluorine Alloy DX10S1540 | — | | — | | Use | |

*[1]Solvent: toluene, ethyl acetate, and isopropyl alcohol in a ratio of 80:5:15 by weight
Abbreviation:
SC. wt: Solid Content weight
SC. by wt: Solid Content by weight

TABLE 8

|  | Example | | | Comparative Example | | |
|---|---|---|---|---|---|---|
|  | 6 | 7 | 8 | 4 | 5 | 6 |
| Guard Film Layer (A) | | | | | | |
| A.T.E. (%) | 400≦ | | | | 400≦ | |
| T.S. (kg/cm²) | 90 | | | | 308 | |
| Clear Coating Layer (B) | | | | | | |
| Surface Non-tackiness | ○ | ○ | ○ | x | ○ | ○ |
| Scratch Resistance | ○ | ○ | ○ | x | ○ | ○ |
| Hardness (N/mm²) | 160 | 120 | 130 | 62 | 150 | 150 |
| \<Uncured Sample\> | | | | | | |
| A.T.E. (%) | 600 | 520 | 460 | 610 | | 480 |
| \<Cured Sample\> | | | | | | |
| A.T.E. (%) | 5 | 6 | 5 | 26 | | 7 |
| T.S. (kg/cm²) | 480 | 420 | 440 | 280 | | 530 |
| Color Coating Layer (C) | | | | | | |
| Viscosity (mPa·S) | 2,000 | | | | 5,500 | |
| Shearing Force with Urea Bond Amount (mmol/g) | 0.70 | | | | | |
| Tg of Acrylic Resin (°C.) | 50 | | | | | |
| Article having the decorative appearance | | | | | | |
| *[2]IV value | 400< | 400< | 400< | 400< | 350 | 350 |
| *[2]SV value | 40 | 40 | 40 | 40 | 25 | 25 |
| *[2]FF value | 2.0< | 2.0< | 2.0< | 2.0< | 1.8 | 1.8 |
| Appearance | ○ | ○ | ○ | ○ | ○ | ○ |
| Adhesion | ○ | ○ | ○ | ○ | x | x |
| Durability | ○ | ○ | ○ | x | x | x |
| Shape-Forming Property | ○ | ○ | ○ | ○ | ○ | x |

*[2]Standard values for Metal Tone: IV value = 350, SV value = 30, FF value = 1.8
Abbreviation:
A.T.E.: After-tearing Elongation
T.S.: Tensile strength

TABLE 9

| | Example 9 | | Example 10 | | Example 11 | |
|---|---|---|---|---|---|---|
| | Amount (g) | SC. wt. (g) | Amount (g) | SC. wt. (g) | Amount (g) | SC. wt. (g) |
| [c] Color Coating Material Solution | | | | | | |
| C1: Acrylic resin | | | | | | |
| NBC2050-55 | 72.7 | 40.0 | 72.7 | 40.0 | 72.7 | 40.0 |
| C2: Urethane resin | | | | | | |
| XE-75-H40 | 171.4 | 60.0 | 171.4 | 60.0 | 171.4 | 60.0 |
| C3: Shining material | | | | | | |
| 91-0562 Alpaste | 15.0 | 10.7 | 15.0 | 10.7 | 15.0 | 10.7 |
| C4: Orientation Control Material | | | | | | |
| Micro ace P-4 | 10.0 | 10.0 | 5.0 | 5.0 | — | — |
| Art pearl C800 | — | — | — | — | 10.0 | 10.0 |
| C5: Other component | | | | | | |
| Leveling agent BYK053 | 2.0 | 2.0 | 2.0 | 2.0 | 2.0 | 2.0 |
| Toluene | 76.3 | — | 67.0 | — | 76.3 | — |
| Total Amount | 347.4 | 122.7 | 333.1 | 117.7 | 347.4 | 122.7 |
| SC. by wt. (%) | 35 | — | 35 | — | 35 | — |
| [b] Clear Coating Material Solution | | | | | | |
| B1: Acrilic-based resin | | | | | | |
| MR8319 | 100.0 | 50.0 | 100.0 | 50.0 | 100.0 | 50.0 |
| B2: Urethane-based Oligomer | | | | | | |
| Ebecril EB8804/10EA | 50.0 | 45.0 | 50.0 | 45.0 | 50.0 | 45.0 |
| B3: Multifunctional Monomer | | | | | | |
| Kayarad DPCA20 | 2.5 | 2.5 | 2.5 | 2.5 | 2.5 | 2.5 |
| NK ester 2G | 2.5 | 2.5 | 2.5 | 2.5 | 2.5 | 2.5 |
| B4: Polymerization initiator | | | | | | |
| Ilgacure-819 | 3.0 | 3.0 | 3.0 | 3.0 | 3.0 | 3.0 |
| B5: Other Component | | | | | | |
| UVA: Tinubin 400 | 2.5 | 2.5 | 2.5 | 2.5 | 2.5 | 2.5 |
| HALS: Sanol LS292 | 1.5 | 1.5 | 1.5 | 1.5 | 1.5 | 1.5 |
| Solvent*[1] | 92.8 | — | 92.8 | — | 92.8 | — |
| Total Amount | 254.8 | 107.0 | 254.8 | 107.0 | 254.8 | 107.0 |
| SC. by wt. (%) | 42 | — | 42 | — | 42 | — |
| [a] Guard Film Layer (A) | | | | | | |
| Nova clear SG007 | Use | | Use | | Use | |

*[1] Solvent: toluene, ethyl acetate, and isopropyl alcohol in a ratio of 80:5:15 by weight
Abbreviation:
SC. wt: Solid Content weight
SC. by wt: Solid Content by weight

TABLE 10

| | Comparative Example 7 | | Comparative Example 8 | |
|---|---|---|---|---|
| | Amount (g) | SC. wt. (g) | Amount (g) | SC. wt. (g) |
| [c] Color Coating Material Solution | | | | |
| C1: Acrylic resin | | | | |
| NBC2050-55 | 72.7 | 40.0 | 72.7 | 40.0 |
| C2: Urethane resin | | | | |
| XE-75-H40 | 171.4 | 60.0 | 171.4 | 60.0 |
| C3: Shining material | | | | |
| 91-0562 Alpaste | 15.0 | 10.7 | 15.0 | 10.7 |
| C4: Orientation Control Material | | | | |
| Micro ace P-4 | 0 | 0 | 25.0 | 25.0 |
| C5: Other component | | | | |
| Leveling agent BYK053 | 2.0 | 2.0 | 2.0 | 2.0 |
| Toluene | 57.8 | — | 104.2 | — |
| Total Amount | 318.9 | 112.7 | 390.3 | 137.7 |
| SC. by wt. (%) | 35 | — | 35 | — |
| [b] Clear Coating Material Solution | | | | |
| B1: Acrilic-based resin | | | | |
| MR8319 | 100.0 | 50.0 | 100.0 | 50.0 |
| B2: Urethane-based Oligomer | | | | |
| Ebecril EB8804/10EA | 50.0 | 45.0 | 50.0 | 45.0 |
| B3: Multifunctional Monomer | | | | |
| Kayarad DPCA20 | 2.5 | 2.5 | 2.5 | 2.5 |
| NK ester 2G | 2.5 | 2.5 | 2.5 | 2.5 |
| B4: Polymerization initiator | | | | |
| Ilgacure-819 | 3.0 | 3.0 | 3.0 | 3.0 |
| B5: Other Component | | | | |
| UVA: Tinubin 400 | 2.5 | 2.5 | 2.5 | 2.5 |
| HALS: Sanol LS292 | 1.5 | 1.5 | 1.5 | 1.5 |
| Solvent *[1] | 92.8 | — | 92.8 | — |
| Total Amount | 254.8 | 107.0 | 254.8 | 107.0 |
| SC. by wt. (%) | 42 | — | 42 | — |
| [a] Guard Film Layer (A) | | | | |
| Nova clear SG007 | Use | | Use | |

*[1] Solvent: toluene, ethyl acetate, and isopropyl alcohol in a ratio of 80:5:15 by weight
Abbreviation:
SC. wt: Solid Content weight
SC. by wt: Solid Content by weight

TABLE 11

| | Example | | | Comparative Example | |
|---|---|---|---|---|---|
| | 1 | 2 | 3 | 1 | 2 |
| Guard Film Layer (A) | | | | | |
| A.T.E. (%) | | 400≤ | | | |
| T.S. (kg/cm$^2$) | | 90 | | | |

TABLE 11-continued

|  | Example |  |  | Comparative Example |  |
|---|---|---|---|---|---|
|  | 1 | 2 | 3 | 1 | 2 |
| Clear Coating Layer (B) | | | | | |
| Surface Non-tackiness | | ○ | | | |
| Scratch Resistance | | ○ | | | |
| Hardness (N/mm$^2$) | | 150 | | | |
| <Uncured Sample> | | | | | |
| A.T.E. (%) | | 480 | | | |
| <Cured Sample> | | | | | |
| A.T.E. (%) | | 7 | | | |
| T.S. (kg/cm$^2$) | | 530 | | | |
| Color Coating Layer (C) | | | | | |
| Urea Bond Amount (mmol/g) | | 0.70 | | | |
| Tg of Acrylic Resin(° C.) | | 50 | | | |
| Evaluation-use Coating Film | | | | | |
| IV value | | 400 | | | |
| SV value | | 95 | | | |
| FF value | | 1.81 | | | |
| Article having decorative appearance | | | | | |
| *$^5$IV value | 220 | 250 | 240 | 400< | 120 |
| *$^5$SV value | 130 | 100 | 110 | 40 | 170 |
| *$^5$FF value | 1.7 | 1.8 | 1.8 | 2.0< | 1.0 |
| Adhesion | ○ | ○ | ○ | ○ | x |
| Durability | ○ | ○ | ○ | ○ | ○ |
| Shape-Forming Property | ○ | ○ | ○ | ○ | ○ |

*$^5$Standard values for Metallic Tone: IV value = 200, SV value = 100, FF value = 1.6

Abbreviation:
A.T.E.: After-tearing Elongation
T.S.: Tensile strength

TABLE 12

|  | Example 12 | | Example 13 | |
|---|---|---|---|---|
|  | SC. wt. (g) | Amount (g) | SC. wt. (g) | Amount (g) |
| [c] Color Coating Material Solution | | | | |
| C1: Acrylic resin | | | | |
| NBC2050-55 | 72.7 | 40.0 | 72.7 | 40.0 |
| C2: Urethane resin | | | | |
| XE-75-H40 | 171.4 | 60.0 | 171.4 | 60.0 |
| C3: Shining material | | | | |
| 91-0562 Alpaste | 15.0 | 10.7 | 15.0 | 10.7 |
| C4: Orientation Control Material | | | | |
| Micro ace P-4 | 15.0 | 15.0 | 5.0 | 5.0 |
| Art pearl C800 | — | — | 5.0 | 5.0 |
| C5: Other component | | | | |
| Leveling agent BYK053 | 2.0 | 2.0 | 2.0 | 2.0 |
| Toluene | 85.6 | — | 76.3 | — |
| Total Amount | 361.7 | 127.7 | 347.4 | 122.7 |
| SC. by wt. (%) | 35 | — | 35 | — |

TABLE 12-continued

|  | Example 12 | | Example 13 | |
|---|---|---|---|---|
|  | SC. wt. (g) | Amount (g) | SC. wt. (g) | Amount (g) |
| [b] Clear Coating Material Solution | | | | |
| B1: Acrilic-based resin | | | | |
| MR8319 | 100.0 | 50.0 | 100.0 | 50.0 |
| B2: Urethane-based Oligomer | | | | |
| Ebecril EB8804/10EA | 50.0 | 45.0 | 50.0 | 45.0 |
| B3: Multifunctional Monomer | | | | |
| Kayarad DPCA20 | 2.5 | 2.5 | 2.5 | 2.5 |
| NK ester 2G | 2.5 | 2.5 | 2.5 | 2.5 |
| B4: Polymerization initiator | | | | |
| Ilgacure-819 | 3.0 | 3.0 | 3.0 | 3.0 |
| B5: Other Component | | | | |
| UVA: Tinubin 400 | 2.5 | 2.5 | 2.5 | 2.5 |
| HALS: Sanol LS292 | 1.5 | 1.5 | 1.5 | 1.5 |
| Solvent *$^1$ | 92.8 | — | 92.8 | — |
| Total Amount | 254.8 | 107.0 | 254.8 | 107.0 |
| SC. by wt. (%) | 42 | — | 42 | — |
| [a] Guard Film Layer (A) | | | | |
| Opulent TPX-X44B | Use | | Use | |

*$^1$ Solvent: toluene, ethyl acetate, and isopropyl alcohol in a ratio of 80:5:15 by weight Abbreviation:
SC. wt: Solid Content weight
SC. by wt: Solid Content by weight

TABLE 13

|  | Example 12 | Example 13 |
|---|---|---|
| Guard Film Layer (A) | | |
| A.T.E. (%) | 400≦ | |
| T.S. (kg/cm$^2$) | 72 | |
| Clear Coating Layer (B) | | |
| Surface Non-tackiness | ○ | |
| Scratch Resistance | ○ | |
| Hardness (N/mm$^2$) | 150 | |
| <Uncured Sample> | | |
| A.T.E. (%) | 480 | |
| <Cured Sample> | | |
| A.T.E. (%) | 7 | |
| T.S. (kg/cm$^2$) | 530 | |
| Color Coating Layer (C) | | |
| Urea Bond Amount (mmol/g) | 0.70 | |
| Tg of Acrylic Resin (° C.) | 50 | |
| Evaluation-use Coating Film | | |
| IV value | 400 | |
| SV value | 95 | |
| FF value | 1.81 | |
| Article having the decorative appearance | | |
| *$^5$IV value | 200 | 225 |
| *$^5$SV value | 150 | 120 |
| *$^5$FF value | 1.6 | 1.75 |

TABLE 13-continued

|  | Example 12 | Example 13 |
|---|---|---|
| Adhesion | ○ | ○ |
| Durability | ○ | ○ |
| Shape-Forming Property | ○ | ○ |

[*5] Standard values for Metallic Tone: IV value = 200, SV value = 100, FF value = 1.6
Abbreviation:
A.T.E.: After-tearing Elongation
T.S.: Tensile strength

TABLE 14

|  | Reference Example | | Example 14 | |
|---|---|---|---|---|
|  | SC. wt. (g) | Amount (g) | SC. wt. (g) | Amount (g) |
| [c] Color Coating Material Solution | | | | |
| C1: Acrylic resin | | | | |
| NBC 2058 | 140.0 | 70.0 | — | — |
| ACR9013 | — | — | 40.0 | 20.0 |
| C2: Urethane resin | | | | |
| XE-75-H3 | 120.0 | 30.0 | — | — |
| XE-75-H29 | — | — | 320.0 | 80.0 |
| C3: Shining material | | | | |
| 91-0562 Alpaste | 15.0 | 10.7 | 15.0 | 10.7 |
| C4: Orientation Control Material | | | | |
| Micro ace P-4 | 10.0 | 10.0 | 10.0 | 10.0 |
| C5: Other component | | | | |
| Leveling agent BYK053 | 2.0 | 2.0 | 2.0 | 2.0 |
| Toluene | 60.4 | — | 0 | — |
| Total Amount | 347.4 | 122.7 | 351.0 | 122.7 |
| SC. by wt. (%) | 35 | — | 35 | — |
| [b] Clear Coating Material Solution | | | | |
| B1: Acrilic-based resin | | | | |
| MR8319 | 70.0 | 35.0 | 130.0 | 65.0 |
| B2: Urethane-based Oligomer | | | | |
| Ebecril EB8804/10EA | 72.2 | 65.0 | 33.3 | 30.0 |
| B3: Multifunctional Monomer | | | | |
| Kayarad DPCA20 | 0 | 0 | 2.5 | 2.5 |
| NK ester 2G | 0 | 0 | 2.5 | 2.5 |
| B4: Polymerization initiator | | | | |
| Ilgacure-819 | 3.0 | 3.0 | 3.0 | 3.0 |
| B5: Other Component | | | | |
| UVA: Tinubin 400 | 2.5 | 2.5 | 2.5 | 2.5 |
| HALS: Sanol LS292 | 1.5 | 1.5 | 1.5 | 1.5 |
| Solvent [*1] | 105.6 | — | 79.5 | — |
| Total Amount | 254.8 | 107.0 | 254.8 | 107.0 |
| SC. by wt. (%) | 42 | — | 42 | — |
| [a] Guard Film Layer (A) | | | | |
| Nova clear SG007 | — | | Use | |
| Opulent TPX-X44B | Use | | — | |

[*1] Solvent: toluene, ethyl acetate, and isopropyl alcohol in a ratio of 80:5:15 by weight
Abbreviation:
SC. wt: Solid Content weight
SC. by wt: Solid Content by weight

TABLE 15

|  | Reference Example | Example 6 |
|---|---|---|
| Guard Film Layer (A) | | |
| A.T.E. (%) | 400≦ | 400≦ |
| T.S. (kg/cm²) | 72 | 90 |
| Clear Coating Layer (B) | | |
| Surface Non-tackiness | ○ | ○ |
| Scratch Resistance | ○ | ○ |
| Hardness (N/mm²) | 120 | 140 |
| <Uncured Sample> | | |
| A.T.E. (%) | 600 | 410 |
| <Cured Sample> | | |
| A.T.E. (%) | 15 | 9 |
| T.S. (kg/cm²) | 400 | 460 |
| Color Coating Layer (C) | | |
| Urea Bond Amount (mmol/g) | 0.98 | 0.56 |
| Tg of Acrylic Resin(° C.) | 70 | 10 |
| Evaluation-use Coating Film | | |
| IV value | 400 | |
| SV value | 95 | |
| FF value | 1.81 | |
| Article having the decorative appearance | | |
| [*5] IV value | 200 | 230 |
| [*5] SV value | 140 | 120 |
| [*5] FF value | 1.6 | 1.75 |
| Adhesion | ○ | ○ |
| Durability | ○ | ○ |
| Shape-Forming Property | ○ | ○ |

[*5] Standard values for Metallic Tone: IV value = 200, SV value = 100, FF value = 1.6
Abbreviation:
A.T.E.: After-tearing Elongation
T.S.: Tensile strength

TABLE 16

|  | Example 15 | | Example 16 | | Example 17 | |
|---|---|---|---|---|---|---|
|  | SC. wt. (g) | Amount (g) | SC. wt. (g) | Amount (g) | SC. wt. (g) | Amount (g) |
| [c] Color Coating Material Solution | | | | | | |
| C1: Acrylic resin | | | | | | |
| NBC2050-55 | 72.7 | 40.0 | 72.7 | 40.0 | 72.7 | 40.0 |

TABLE 16-continued

|  | Example 15 | | Example 16 | | Example 17 | |
| --- | --- | --- | --- | --- | --- | --- |
|  | SC. wt. (g) | Amount (g) | SC. wt. (g) | Amount (g) | SC. wt. (g) | Amount (g) |
| C2: Urethane resin | | | | | | |
| XE-75-H40 | 171.4 | 60.0 | 171.4 | 60.0 | 171.4 | 60.0 |
| C3: Shining material | | | | | | |
| 91-0562 Alpaste | 15.0 | 10.7 | 15.0 | 10.7 | 15.0 | 10.7 |
| C4: Orientation Control Material | | | | | | |
| Micro ace P-4 | 10.0 | 10.0 | 10.0 | 10.0 | 10.0 | 10.0 |
| C5: Other component | | | | | | |
| Leveling agent BYK053 | 2.0 | 2.0 | 2.0 | 2.0 | 2.0 | 2.0 |
| Toluene | 76.3 | — | 76.3 | — | 76.3 | — |
| Total Amount | 347.4 | 122.7 | 347.4 | 122.7 | 347.4 | 122.7 |
| SC. by wt. (%) | 35 | — | 35 | — | 35 | — |
| [b] Clear Coating Material Solution | | | | | | |
| B1: Acrilic-based resin | | | | | | |
| MR8319 | 90.0 | 45.0 | — | — | — | — |
| BR77 | — | — | 50.0 | 50.0 | — | — |
| BR82 | — | — | — | — | 50.0 | 50.0 |
| B2: Urethane-based Oligomer | | | | | | |
| Ebecril EB8804/10EA | 27.8 | 25.0 | 44.4 | 40.0 | 44.4 | 40.0 |
| B3: Multifunctional Monomer | | | | | | |
| Kayarad DPCA20 | 15 | 15 | 5 | 5 | 5 | 5 |
| NK ester 2G | 15 | 15 | 5 | 5 | 5 | 5 |
| B4: Polymerization initiator | | | | | | |
| Ilgacure-819 | 3.0 | 3.0 | 3.0 | 3.0 | 3.0 | 3.0 |
| B5: Other Component | | | | | | |
| UVA: Tinubin 400 | 2.5 | 2.5 | 2.5 | 2.5 | 2.5 | 2.5 |
| HALS: Sanol LS292 | 1.5 | 1.5 | 1.5 | 1.5 | 1.5 | 1.5 |
| Solvent[*1] | 100.0 | — | 143.4 | — | 143.4 | — |
| Total Amount | 254.8 | 107.0 | 254.8 | 107.0 | 254.8 | 107.0 |
| SC. by wt. (%) | 42 | — | 42 | — | 42 | — |
| [a] Guard Film Layer (A) | | | | | | |
| Nova clear SG007 | Use | | Use | | Use | |

[*1]Solvent: toluene, ethyl acetate, and isopropyl alcohol in a ratio of 80:5:15 by weight
Abbreviation:
SC. wt: Solid Content weight
SC. by wt: Solid Content by weight

TABLE 17

|  | Comparative Example | | Comparative Example | | Comparative Example | |
| --- | --- | --- | --- | --- | --- | --- |
|  | SC. wt. (g) | Amount (g) | SC. wt. (g) | Amount (g) | SC. wt. (g) | Amount (g) |
| [c] Color Coating Material Solution | | | | | | |
| C1: Acrylic resin | | | | | | |
| NBC2050-55 | 72.7 | 40.0 | 9.1 | 5.0 | 9.1 | 5.0 |
| C2: Urethane resin | | | | | | |
| XE-75-H40 | 171.4 | 60.0 | 271.4 | 95.0 | 271.4 | 95.0 |

TABLE 17-continued

|  | Comparative Example | | Comparative Example | | Comparative Example | |
| --- | --- | --- | --- | --- | --- | --- |
|  | SC. wt. (g) | Amount (g) | SC. wt. (g) | Amount (g) | SC. wt. (g) | Amount (g) |
| C3: Shining material | | | | | | |
| 91-4061 Alpaste | 15.0 | 10.7 | 15.0 | 10.7 | 15.0 | 10.7 |
| C4: Orientation Control Material | | | | | | |
| Micro ace P-4 | 10.0 | 10.0 | 10.0 | 10.0 | 10.0 | 10.0 |
| C5: Other component | | | | | | |
| Leveling agent BYK053 | 2.0 | 2.0 | 2.0 | 2.0 | 2.0 | 2.0 |
| Toluene | 76.3 | — | 39.9 | — | 39.9 | — |
| Total Amount | 347.4 | 122.7 | 347.4 | 122.7 | 347.4 | 122.7 |
| SC. by wt. (%) | 35 | — | 35 | — | 35 | — |
| [b] Clear Coating Material Solution | | | | | | |
| B1: Acrilic-based resin | | | | | | |
| MR8319 | 40.0 | 20.0 | 100.0 | 50.0 | 100.0 | 50.0 |
| B2: Urethane-based Oligomer | | | | | | |
| Ebecril EB8804/10EA | 88.9 | 80.0 | 50.0 | 45.0 | 50.0 | 45.0 |
| B3: Multifunctional Monomer | | | | | | |
| Kayarad DPCA20 | 0 | — | 2.5 | 2.5 | 2.5 | 2.5 |
| NK ester 2G | 0 | — | 2.5 | 2.5 | 2.5 | 2.5 |
| B4: Polymerization initiator | | | | | | |
| Ilgacure-819 | 3.0 | 3.0 | 3.0 | 3.0 | 3.0 | 3.0 |
| B5: Other Component | | | | | | |
| UVA: Tinubin 400 | 2.5 | 2.5 | 2.5 | 2.5 | 2.5 | 2.5 |
| HALS: Sanol LS292 | 1.5 | 1.5 | 1.5 | 1.5 | 1.5 | 1.5 |
| Solvent[*1] | 118.9 | — | 92.8 | — | 92.8 | — |
| Total Amount | 254.8 | 107.0 | 254.8 | 107.0 | 254.8 | 107.0 |
| SC. by wt. (%) | 42 | — | 42 | — | 42 | — |
| a] Guard Film Layer (A) | | | | | | |
| Nova clear SG007 | Use | | Use | | — | |
| Fluorine Alloy DX10S1540 | — | | — | | Use | |

[*1]Solvent: toluene, ethyl acetate, and isopropyl alcohol in a ratio of 80:5:15 by weight
Abbreviation:
SC. wt: Solid Content weight
SC. by wt: Solid Content by weight

TABLE 18

|  | Example | | | Comparative Example | | |
| --- | --- | --- | --- | --- | --- | --- |
|  | 15 | 16 | 17 | 9 | 10 | 11 |
| Guard Film Layer (A) | | | | | | |
| A.T.E. (%) | | 400≦ | | | 400≦ | |
| T.S. (kg/cm$^2$) | | 90 | | | 308 | |
| Clear Coating Layer (B) | | | | | | |
| Surface Non-tackiness | ○ | ○ | ○ | x | ○ | ○ |
| Scratch Resistance | ○ | ○ | ○ | x | ○ | ○ |
| Hardness (N/mm$^2$) | 160 | 120 | 130 | 62 | 150 | 150 |

TABLE 18-continued

|  | Example | | | Comparative Example | | |
|---|---|---|---|---|---|---|
|  | 15 | 16 | 17 | 9 | 10 | 11 |
| <Uncured Sample> | | | | | | |
| A.T.E. (%) | 400 | 520 | 460 | 610 |  | 480 |
| <Cured Sample> | | | | | | |
| A.T.E. (%) | 5 | 6 | 5 | 26 |  | 7 |
| T.S. (kg/cm$^2$) | 580 | 420 | 440 | 280 |  | 530 |
| Color Coating Layer (C) | | | | | | |
| Urea Bond Amount (mmol/g) | | | | 0.70 | | |
| Tg of Acrylic Resin(° C.) | | | | 50 | | |
| Evaluation-use Coating Film | | | | | | |
| IV value | | | | 400 | | |
| SV value | | | | 95 | | |
| FF value | | | | 1.81 | | |

TABLE 18-continued

|  | Example | | | Comparative Example | | |
|---|---|---|---|---|---|---|
|  | 15 | 16 | 17 | 9 | 10 | 11 |
| Article having decorative appearance | | | | | | |
| *[5]IV value | 220 | 220 | 220 | 220 | 180 | 180 |
| *[5]SV value | 130 | 130 | 130 | 130 | 125 | 125 |
| *[5]FF value | 1.7 | 1.7 | 1.7 | 1.7 | 1.1 | 1.1 |
| Adhesion | ○ | ○ | ○ | ○ | x | x |
| Durability | ○ | ○ | ○ | x | x | x |
| Shape-Forming Property | ○ | ○ | ○ | ○ | ○ | x |

*[5]Standard values for Metallic Tone: IV value = 200, SV value = 100, FF value = 1.6

Abbreviation:
A.T.E.: After-tearing Elongation
T.S.: Tensile strength

TABLE 19

|  | Manufacturer | Solid Content | Molecular weight | Properties |
|---|---|---|---|---|
| C1: Acrylic resin | | | | |
| NBC 2050-55 | Toray | 55% | 16,000 | *[6]OHV = 40 KOH mg/g |
| NBC 2058 | Industries. Inc. | 50% | 16,000 | *[6]OHV = 40 KOH mg/g |
| ACR 9013 | Nippon Paint Co., Ltd. | 50% | 6,500 | *[6]OHV = 150 KOH mg/g |
| C2: Urethane resin | | | | |
| XE-75-H40 | Mitsui Takeda | 35% | 56,000 | *[6]OHV = 20 KOH mg/g |
| XE-75-H3 | Chemicals. | 25% | 69,000 | *[6]OHV = 0 KOH mg/g |
| XE-75-H29 | Inc. | 25% | 60,000 | *[6]OHV = 20 KOH mg/g |
| C3: Shining material | | | | |
| 91-4061 Alpaste | Toyo Aluminium K.K. | 71% | — | Evaluation-use film: IV value = 267, SV value = 136, FF value = 1.63 |
| 52-509 Alpaste | | 65% | — | Evaluation-use film: IV value = 331, SV value = 101, FF value = 1.77 |
| 91-0562 Alpaste | | 71% | — | Evaluation-use film: IV value = 400, SV value = 95, FF value = 1.81 |
| C3: Orientation Control Material | | | | |
| Micro Ace P-4 | Japan Talc | 100% | — | Extender Pigment |
| Art Pearl C800 | Negami Chemical Industrials Co., Ltd. | 100% | — | Urethane resin Bead |
| C5: Other component | | | | |
| Leveling agent BYK 053 | BYK Chemy Japan Co., Ltd. | 100% | — | — |

*[6]OHV: hydroxyl group value

TABLE 20

| Material used | Manufacturer | Solid Content | Molecular Weight | Properties |
|---|---|---|---|---|
| B1: Acrylic-based resin | | | | |
| MR8319 | Mitsubishi Rayon Co., Ltd. | 50% | 70,000 | Polymerizable double bond Equivalent: 950 g, *[6]OHV = 59 KOH mg/g, Acid Value: 30 KOH mg/g |
| BR77 | | 100% | 60,000 | *[7]Tg = 80° C., Acid Value: 19 KOH mg/g |
| BR82 | | 100% | 150,000 | *[7]Tg = 95° C., Acid Value: 0 KOH mg/g |
| B2: Urethane-based oligomer | | | | |
| Acryl EB8804/10EA | Daicel UCB Co., Ltd. | 90% | 1,000 | Polymerizable double bond Number: 2 |
| B3: Multifunctional monomer | | | | |
| Kayarad DPCA20 | Nippon Kayaku Co., Ltd. | 100% | 807 | Polymerizable double bond Number: 6 |
| NK Ester 2G | Shin-nakamura chemical Corp. | 100% | 242 | Polymerizable double bond Number: 2 |
| B4: Polymerization initiator | | | | |
| Ilgacure-819 | Chiba Specialty Chemicals K.K. | 100% | — | — |
| B5: Other component | | | | |
| Ultraviolet ray Absorbing Agent (UVA) Tinubin 400 | Chiba Specialty Chemicals K.K. | 100% | — | — |
| Light Stabilizer (HALS) Sanol LS292 | Sankyo Co., Ltd. | 100% | — | — |
| A: Guard film layer | | | | |
| Nova ClearSG007 | Mitsubishi Chemical Corp. | — | — | Water Contact Angle: 78°, Transmittance (for light having wavelength of 365 nm): 80% |
| Opulent TPX-X44B | Mitsui Chemical Inc. | — | — | Water Contact Angle: 100°, Transmittance (for light having wavelength of 365 nm): 73% |
| Fluorine Alloy DX10S1540 | Denki Kagaku Kogyo Kabushiki Kaisha | — | — | Water Contact Angle: 80°, Transmittance (for light having wavelength of 365 nm): 70% |

*[6]OHV: hydroxyl group value
*[7]Tg: Glass Transition Temperature

As described above, the laminate film of the present invention may be so arranged as to further include an adhesive agent layer on the color coating layer (C).

Moreover, the laminate film of the present invention is preferably arranged such that the color coating material contains, based on 100 parts by weight of a total amount (C1+C2) of the acrylic resin (C1) and the urethane resin (C2) by solid content: the acrylic resin (C1), by solid content, not less than 10 parts by weight and not more than 80 parts by weight; the urethane resin (C2), by solid content, not less than 20 parts by weight and not more than 90 parts by weight; and the aluminum flake, by solid content, not less than 1 part by weight and not more than 30 parts by weight; the clear coating layer (B) is formed by applying a clear coating material containing at least acrylic-based resin (B1), an urethane-based oligomer (B2), a multifunctional monomer (B3), and a polymerization initiator (B4); and the clear coating material contains, based on 100 part by weight of the total amount (B1+B2+B3) of the acrylic-based resin (B1), the urethane-based oligomer (B2), and the multifunctional monomer (B3) by solid contents by weight: the acrylic-based resin (B1), by solid content, not less than 29 parts by weight and not more than 70 parts by weight; the urethane-based oligomer (B2), by solid content, not less than 20 parts by weight and not more than 70 parts by weight; and the multifunctional monomer (B3), by solid content, not less than 1 part by weight and not more than 40 parts by weight; and the polymerization initiator (B4), by solid content, not less than 0.1 part by weight and not more than 20 parts by weight.

Furthermore, the laminate film of the present invention is preferably arranged such that the urethane resin (C2) has a urea bonding amount not less than 0.14 mmol/g and not more than 1.12 mmol/g; and the acrylic resin (C1) has a glass transition temperature not less than 0° C. and not more than 100° C.

Further, the laminate film is preferably arranged such that the clear coating material has a photo curing property; before photo-curing, the clear coating layer (B) containing the clear coating material has after-tearing elongation of 400% or more at 80° C.; and after photo-curing, the clear coating layer (B) containing the clear coating material has a universal hardness of 80N/mm$^2$ or more at 25° C., and a tensile strength of 400 kg/cm$^2$ or more at 20° C.

Moreover, the laminate film is preferably arranged such that the guard film layer (A) has a tensile strength not less than 10 kg/cm$^2$ and not more than 200 kg/cm$^2$ at 20° C.

With those arrangements, it is possible to provide a laminate film having (i) excellent ornamental properties such as (a) an aesthetic appearance in a metal tone having a high flip-flop property, (b) an aesthetic appearance in a metallic tone, (c) shininess, and/or (d) light scattering property, the ornamental properties being equivalent or better than the metal-tone appearance or the metallic-tone appearance attained by the spray coating. Especially, in case where the color coating material contains the orientation control material (C4), it is possible to attain a laminate film having a high IV value, a high SV value, and a high FF value, even if the IV value and the SV value of the evaluation-use coating film containing the aluminum flake are relatively low.

Moreover, the laminate film has an excellent shape-suiting property for copying the three-dimensional shape of the base article when placing the laminate film on the base article. Thus, with the laminate film, it is possible to attain appearance property excellent in surface smoothness of the surface of the laminate film surface placed on the base article, reproducibility of the three-dimensional shape of the base article, and the like property. Further, by placing the laminate film on the base article, it is possible to attain (i) chemical properties such as the durability and the like, and (ii) physical properties such as scratching resistance, impact resistance, firm adhesion between the laminate film and the base article, and the like.

With this arrangement, it is possible to provide an article, which has a decorative appearance, having excellent ornamental properties, excellent appearance properties such as the surface smoothness of the laminate film placed on the article, and excellent chemical/physical properties.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A laminate film that includes a guard film layer (A), a clear coating layer (B), and a color coating layer (C), the clear coating layer (B) being provided on the guard film layer (A), and the color coating layer (C) being formed by applying a color coating material on the clear coating layer (C), wherein:
   the color coating material contains at least acrylic resin (C1), urethane resin (C2), and a shining material (C3), and has a viscosity not less than 1000 mPa·S and not more than 5000 mPa·S at 25° C.;
   the shining material (C3) contains at least an aluminum flake, which gives an SV value of 120 or more, and an IV value of 200 or more, to an evaluation-use coating film containing the aluminum flake; and
   the color coating material layer (C) is formed by applying the color coating material with a shearing force.

2. The laminate film as set forth in claim 1, wherein:
   the color coating layer (C) is formed by applying the color coating material with a shearing force by using at least one of an applicator, a die coater, a bar coater, a roll coater, and a comma coater.

3. The laminate film as set forth in claim 1, further comprising:
   an adhesive agent layer on the color coating layer (C).

4. The laminate film as set forth in claim 1, wherein:
   the color coating material contains, based on 100 parts by weight of a total amount (C1+C2) of the acrylic resin (C1) and the urethane resin (C2) by solid content:
   the acrylic resin (C1), by solid content, not less than 10 parts by weight and not more than 80 parts by weight;
   the urethane resin (C2), by solid content, not less than 20 parts by weight and not more than 90 parts by weight; and
   the aluminum flake, by solid content, not less than 1 part by weight and not more than 30 parts by weight;
   the clear coating layer (B) is formed by applying a clear coating material containing at least acrylic-based resin (B1), an urethane-based oligomer (B2), a multifunctional monomer (B3), and a polymerization initiator (B4); and
   the clear coating material contains, based on 100 part by weight of the total amount (B1+B2+B3) of the acrylic-based resin (B1), the urethane-based oligomer (B2), and the multifunctional monomer (B3) by solid contents by weight:
   the acrylic-based resin (B1), by solid content, not less than 29 parts by weight and not more than 70 parts by weight;
   the urethane-based oligomer (B2), by solid content, not less than 20 parts by weight and not more than 70 parts by weight; and
   the multifunctional monomer (B3), by solid content, not less than 1 part by weight and not more than 40 parts by weight; and
   the polymerization initiator (B4), by solid content, not less than 0.1 part by weight and not more than 20 parts by weight.

5. The laminate film as set forth in claim 1, wherein:
   the urethane resin (C2) has a urea bonding amount not less than 0.14 mmol/g and not more than 1.12 mmol/g; and
   the acrylic resin (C1) has a glass transition temperature not less than 0° C. and not more than 100° C.

6. The laminate film as set forth in claim 1, wherein:
   the clear coating material has a photo curing property;
   before photo-curing, the clear coating layer (B) containing the clear coating material has after-tearing elongation of 400% or more at 80° C.; and
   after photo-curing, the clear coating layer (B) containing the clear coating material has a universal hardness of 80N/mm$^2$ or more at 25° C., and a tensile strength of 400 kg/cm$^2$ or more at 20° C.

7. The laminate film as set forth in claim 1, wherein:
   the guard film layer (A) has a tensile strength not less than 10 kg/cm$^2$ and not more than 200 kg/cm$^2$ at 20° C.

8. The laminate film as set forth in claim 3, further comprising:
   an inner film layer on the adhesive agent layer.

9. A laminate film that includes a guard film layer (A), a clear coating layer (B), and a color coating layer (C), the clear coating layer (B) being provided on the guard film layer (A), and the color coating layer (C) being formed by applying a color coating material on the clear coating layer (C), wherein:
   the clear coating layer (B) contains a clear coating material containing at least (i) acrylic-based resin (B1), (ii) urethane-based oligomer (B2), (iii) a multifunctional monomer (B3), and (iv) a polymerization initiator (B4);
   the clear coating material contains, based on 100 part by weight of the total amount (B1+B2+B3) of the acrylic-based resin (B1), the urethane-based oligomer (B2), and the multifunctional monomer (B3) by solid contents by weight:
   the acrylic-based resin (B1), by solid content, not less than 29 parts by weight and not more than 70 parts by weight;
   the urethane-based oligomer (B2), by solid content, not less than 20 parts by weight and not more than 70 parts by weight; and the multifunctional monomer (B3), by solid content, not less than 1 part by weight and not more than 40 parts by weight; and the polymerization initiator (B4), by solid content, not less than 0.1 part by weight and not more than 20 parts by weight;

the color coating layer (C) contains a color coating material containing at least (i') acrylic resin (C1), (ii') urethane resin (C2), (iii') a shining material (C3), and (iv') an orientation control material (C4), the shining material (C3) containing at least an aluminum flake, which gives an SV value of 85 or more, and an IV value of 250 or more, to an evaluation-use coating film containing the aluminum flake, and the orientation control material (C4) containing at least one of an extender pigment and a resin bead;

the color coating material contains, based on 100 parts by weight of a total amount (C1+C2) of the acrylic resin (C1) and the urethane resin (C2) by solid content:

the acrylic resin (C1), by solid content, not less than 10 parts by weight and not more than 80 parts by weight;

the urethane resin (C2), by solid content, not less than 20 parts by weight and not more than 90 parts by weight;

the aluminum flake, by solid content, not less than 1 part by weight and not more than 30 parts by weight; and the orientation control material (C4), by solid content, not less than 2 parts by weight and not more than 20 parts by weight.

10. The laminate film as set forth in claim 9, further comprising:

an adhesive agent layer on the color coating layer (C).

11. The laminate film as set forth in claim 9, wherein:

the urethane resin (C2) has a urea bonding amount not less than 0.14 mmol/g and not more than 1.12 mmol/g; and the acrylic resin ($C_1$) has a glass transition temperature not less than 0° C. and not more than 100° C.

12. The laminate film as set forth in claim 9, wherein:

the clear coating material has a photo curing property;

before photo-curing, the clear coating layer (B) containing the clear coating material has after-tearing elongation of 400% or more at 80° C.; and after photo-curing, the clear coating layer (B) containing the clear coating material has a universal hardness of 80N/mm$^2$ or more at 25° C., and a tensile strength of 400 kg/cm$^2$ or more at 20° C.

13. The laminate film as set forth in claim 9, wherein:

the guard film layer (A) has a tensile strength not less than 10 kg/cm$^2$ and not more than 200 kg/cm$^2$ at 20° C.

14. The laminate film as set forth in claim 10, further comprising:

an inner film layer on the adhesive agent layer.

15. An article comprising a laminate film provided on a base article, wherein:

the laminate film includes a guard film layer (A), a clear coating layer (B), and a color coating layer (C), the clear coating layer (B) being provided on the guard film layer (A), and the color coating layer (C) being formed by applying a color coating material on the clear coating layer (C);

the color coating material contains at least acrylic resin (C1), urethane resin (C2), and a shining material (C3), and has a viscosity not less than 1000 mPa·S and not more than 5000 mPa·S at 25° C.;

the shining material (C3) contains at least an aluminum flake, which gives an SV value of 120 or more and an IV value of 200 or more, to an evaluation-use coating film containing the aluminum flake; and the color coating material layer (C) is formed by applying the color coating material with a shearing force.

16. An article comprising a laminate film provided on a base article, wherein:

the laminate film includes a guard film layer (A), a clear coating layer (B), and a color coating layer (C), the clear coating layer (B) being provided on the guard film layer (A), and the color coating layer (C) being formed by applying a color coating material on the clear coating layer (C);

the clear coating layer (B) contains a clear coating material containing at least (i) acrylic-based resin (B1), (ii) urethane-based oligomer (B2), (iii) a multifunctional monomer (B3), and (iv) a polymerization initiator (B4);

the clear coating material contains, based on 100 part by weight of the total amount (B1+B2+B3) of the acrylic-based resin (B1), the urethane-based oligomer (B2), and the multifunctional monomer (B3) by solid contents by weight:

the acrylic-based resin (B1), by solid content, not less than 29 parts by weight and not more than 70 parts by weight;

the urethane-based oligomer (B2), by solid content, not less than 20 parts by weight and not more than 70 parts by weight; and the multifunctional monomer (B3), by solid content, not less than 1 part by weight and not more than 40 parts by weight; and the polymerization initiator (B4), by solid content, not less than 0.1 part by weight and not more than 20 parts by weight;

the color coating layer (C) contains a color coating material containing at least (i') acrylic resin (C1), (ii') urethane resin (C2), (iii') a shining material (C3), and (iv') an orientation control material (C4), the shining material (C3) containing at least an aluminum flake, which gives an SV value of 85 or more and an IV value of 250 or more, to an evaluation-use coating film containing the aluminum flake, and the orientation control material (C4) containing at least one of an extender pigment and a resin bead;

the color coating material contains, based on 100 parts by weight of a total amount (C1+C2) of the acrylic resin (C1) and the urethane resin (C2) by solid content:

the acrylic resin (C1), by solid content, not less than 10 parts by weight and not more than 80 parts by weight;

the urethane resin (C2), by solid content, not less than 20 parts by weight and not more than 90 parts by weight;

the aluminum flake, by solid content, not less than 1 part by weight and not more than 30 parts by weight; and the orientation control material (C4), by solid content, not less than 2 parts by weight and not more than 20 parts by weight.

* * * * *